United States Patent
Kim et al.

(10) Patent No.: US 12,341,984 B2
(45) Date of Patent: Jun. 24, 2025

(54) TRUNCATION ERROR SIGNALING AND ADAPTIVE DITHER FOR LOSSY BANDWIDTH COMPRESSION

(71) Applicant: QUALCOMM Incorporated, San Diego, CA (US)

(72) Inventors: Hyung Joon Kim, San Diego, CA (US); Wei-Jung Chien, San Diego, CA (US); Cheng-Teh Hsieh, Del Mar, CA (US); Marta Karczewicz, San Diego, CA (US); Natan Jacobson, San Diego, CA (US); Tao Wang, Sunnyvale, CA (US); Clara Ka Wah Sung, Markham (CA); Andrew Edmund Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 18/066,087

(22) Filed: Dec. 14, 2022

(65) Prior Publication Data

US 2024/0205433 A1    Jun. 20, 2024

(51) Int. Cl.
*H01L 29/94* (2006.01)
*H04N 19/124* (2014.01)
*H04N 19/34* (2014.01)
*H04N 19/60* (2014.01)

(52) U.S. Cl.
CPC ........... *H04N 19/34* (2014.11); *H04N 19/124* (2014.11); *H04N 19/60* (2014.11)

(58) Field of Classification Search
CPC ...... H04N 19/34; H04N 19/124; H04N 19/60; H04N 19/184; H04N 19/85; G06T 9/00
See application file for complete search history.

(56) References Cited

U.S. PATENT DOCUMENTS

| | | |
|---|---|---|
| 7,272,567 B2 | 9/2007 | Fejzo |
| 8,270,498 B2 | 9/2012 | Filippini et al. |
| 8,873,871 B2 | 10/2014 | Fukuhara et al. |
| 2003/0108099 A1* | 6/2003 | Nagumo ................. G06T 9/20 375/E7.199 |

(Continued)

OTHER PUBLICATIONS

Partial International Search Report—PCT/US2023/081620—ISA/EPO—Apr. 23, 2024.

(Continued)

*Primary Examiner* — Joseph Suh
(74) *Attorney, Agent, or Firm* — Procopio, Cory, Hargreaves & Savitch

(57) ABSTRACT

Systems, devices, apparatus, and methods, including computer programs encoded on storage media, for truncation error signaling and adaptive dither for lossy bandwidth compression are described. A processor may perform a truncation process for data, where the data is associated with display processing, image processing, or the data processing, where the truncation process for the data results in truncated data. The processor may compute a set of truncation error values associated with the truncation process for the truncated data. The processor may generate a set of residual samples for the truncated data. The processor may generate a bitstream based on the set of residual samples for the truncated data and the set of truncation error values associated with the truncation process.

30 Claims, 11 Drawing Sheets

(56) References Cited

U.S. PATENT DOCUMENTS

| | | | |
|---|---|---|---|
| 2003/0194010 A1* | 10/2003 | Mukerjee | H04N 19/523 |
| | | | 375/E7.26 |
| 2005/0117805 A1* | 6/2005 | Poutet | H04N 19/90 |
| | | | 375/E7.207 |
| 2006/0080374 A1* | 4/2006 | Mitchell | G06F 17/147 |
| | | | 708/400 |
| 2007/0040847 A1* | 2/2007 | Thebault | G09G 3/2044 |
| | | | 345/616 |
| 2007/0160146 A1 | 7/2007 | Bright et al. | |
| 2008/0063085 A1 | 3/2008 | Wu et al. | |
| 2009/0180555 A1* | 7/2009 | Sun | H04N 19/14 |
| | | | 375/E7.121 |
| 2009/0257493 A1* | 10/2009 | Ye | H04N 19/523 |
| | | | 375/E7.243 |
| 2010/0046804 A1 | 2/2010 | Gu et al. | |
| 2010/0135575 A1 | 6/2010 | Guo et al. | |
| 2010/0231426 A1 | 9/2010 | Van Der Vleuten | |
| 2010/0296745 A1* | 11/2010 | Strom | H04N 19/176 |
| | | | 382/233 |
| 2011/0095820 A1* | 4/2011 | Hou | H03F 3/24 |
| | | | 330/149 |
| 2012/0087411 A1 | 4/2012 | Haskell | |
| 2012/0098847 A1 | 4/2012 | Parmar et al. | |
| 2012/0230595 A1* | 9/2012 | Kubo | H04N 19/90 |
| | | | 382/232 |
| 2012/0230599 A1* | 9/2012 | Norkin | H04N 19/60 |
| | | | 382/238 |
| 2012/0287141 A1 | 11/2012 | Higgins et al. | |
| 2015/0374313 A1* | 12/2015 | Kogure | H04N 19/436 |
| | | | 382/131 |
| 2016/0190816 A1* | 6/2016 | Rehm | H02J 50/12 |
| | | | 307/104 |
| 2019/0018673 A1* | 1/2019 | Langhammer | G06F 7/509 |
| 2021/0204020 A1* | 7/2021 | Gao | H04N 21/4227 |

OTHER PUBLICATIONS

International Search Report and Written Opinion—PCT/US2023/081620—ISA/EPO—Jul. 23, 2024.

* cited by examiner

TRUNCATION ERROR SIGNALING AND ADAPTIVE DITHER FOR LOSSY BANDWIDTH COMPRESSION

TECHNICAL FIELD

The present disclosure relates generally to processing systems, and more particularly, to one or more techniques for data processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current compression techniques may not be effective in mitigating visual artifacts produced as a by-product of a compression/decompression procedure. There is a need for improved techniques for compression/decompression for images as well as other types of data.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for data processing are provided. The apparatus includes a memory and at least one processor coupled to the memory and, based at least in part on information stored in the memory, the at least one processor is configured to: perform a truncation process for data, where the data is associated with display processing, image processing, or the data processing, where the truncation process for the data results in truncated data; compute a set of truncation error values associated with the truncation process for the truncated data; generate a set of residual samples for the truncated data; and generate a bitstream based on the set of residual samples for the truncated data and the set of truncation error values associated with the truncation process.

In an aspect of the disclosure, a method, a computer-readable medium, and an apparatus for data processing are provided. The apparatus includes a memory and at least one processor coupled to the memory and, based at least in part on information stored in the memory, the at least one processor is configured to: obtain a bitstream associated with a set of residual samples for truncated data and a set of truncation error values for a truncation process, where the bitstream corresponds to data associated with display processing, image processing, or the data processing; parse, from the bitstream, the set of residual samples for the truncated data and the set of truncation error values to obtain a set of parsed residual samples for the truncated data; and reconstruct the truncated data based on the set of parsed residual samples and the set of truncation error values, where the reconstruction of the truncated data results in untruncated data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
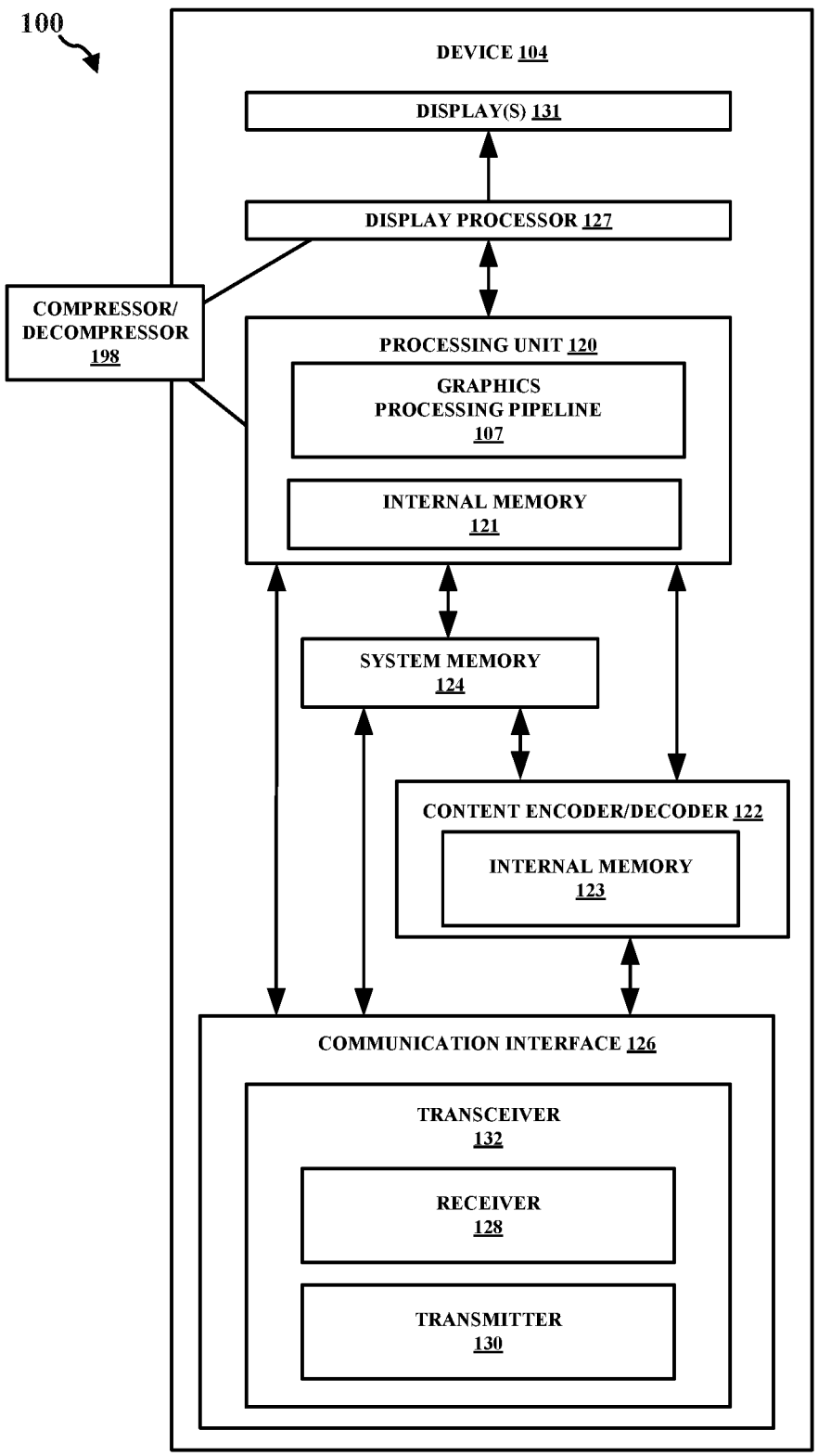
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Many devices (e.g., CPUs, GPUs, DPUs, etc.) may perform a compression/decompression process on data (e.g., image data) in order to conserve memory bandwidth when the data is written to memory or read from memory. For example, a GPU may compress a surface (i.e., data) and transmit the compressed surface to a DPU, whereupon the DPU may decompress the surface and cause the surface to be displayed on a display. Some compression processes (e.g., lossy compression) may cause errors (e.g., visual artifacts) to be introduced into data when the data is reconstructed (i.e., decompressed).

Various technologies pertaining to truncation error signaling and adaptive dither for lossy bandwidth compression are disclosed herein. In an example, an apparatus (i.e., an encoder) performs a truncation process for data, where the data is associated with display processing, image processing, or data processing, where the truncation process for the data results in truncated data. The apparatus computes a set of truncation error values (e.g., a set of average truncation error values) associated with the truncation process for the truncated data. The apparatus generates a set of residual samples for the truncated data. The apparatus generates a bitstream based on the set of residual samples for the truncated data and the set of truncation error values associated with the truncation process. In a further example, the apparatus (or another apparatus, i.e., a decoder) obtains a bitstream associated with a set of residual samples for truncated data and a set of truncation error values for a truncation process, where the bitstream corresponds to data associated with display processing, image processing, or data processing. The apparatus parses, from the bitstream, the set of residual samples for the truncated data and the set of truncation error values to obtain a set of parsed residual samples for the truncated data. The apparatus reconstructs the truncated data based on the set of parsed residual samples and the set of truncation error values, where the reconstruction of the truncated data results in untruncated data. Vis-à-vis including the set of truncation error values in the bitstream, the untruncated data produced as a result of the reconstruction of the truncated data may have fewer errors (e.g., visual artifacts) than untruncated data that is produced as a result of a reconstruction process that is not based upon a set of truncation error values included in a bitstream. Furthermore, by utilizing the set of truncation error values as part of a dither process, the aforementioned technologies may also reduce occurrences of errors in comparison to other compression/decompression techniques. Thus, the aforementioned technologies may increase an accuracy of image reproduction in comparison to other compression/decompression techniques.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content. The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 and/or the display processor 127 may include a compressor/decompressor 198 configured to perform a truncation process for data, where the data is associated with display processing, image processing, or data processing, where the truncation process for the data results in truncated data; compute a set of truncation error values associated with the truncation process for the truncated data; generate a set of residual samples for the truncated data; and generate a bitstream based on the set of residual samples for the truncated data and the set of truncation error values associated with the truncation process. In certain aspects, the compressor/decompressor 198 is configured to obtain a bitstream associated with a set of residual samples for truncated data and a set of truncation error values for a truncation process, where the bitstream corresponds to data associated with display processing, image processing, or data processing; parse, from the bitstream, the set of residual samples for the truncated data and the set of truncation error values to obtain a set of parsed residual samples for the truncated data; and reconstruct the truncated data based on the set of parsed residual samples and the set of truncation error values, where the reconstruction of the truncated data results in untruncated data. Although the following description may be focused on data processing, the concepts described herein may be applicable to other similar processing techniques, such as graphics processing or display processing. A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
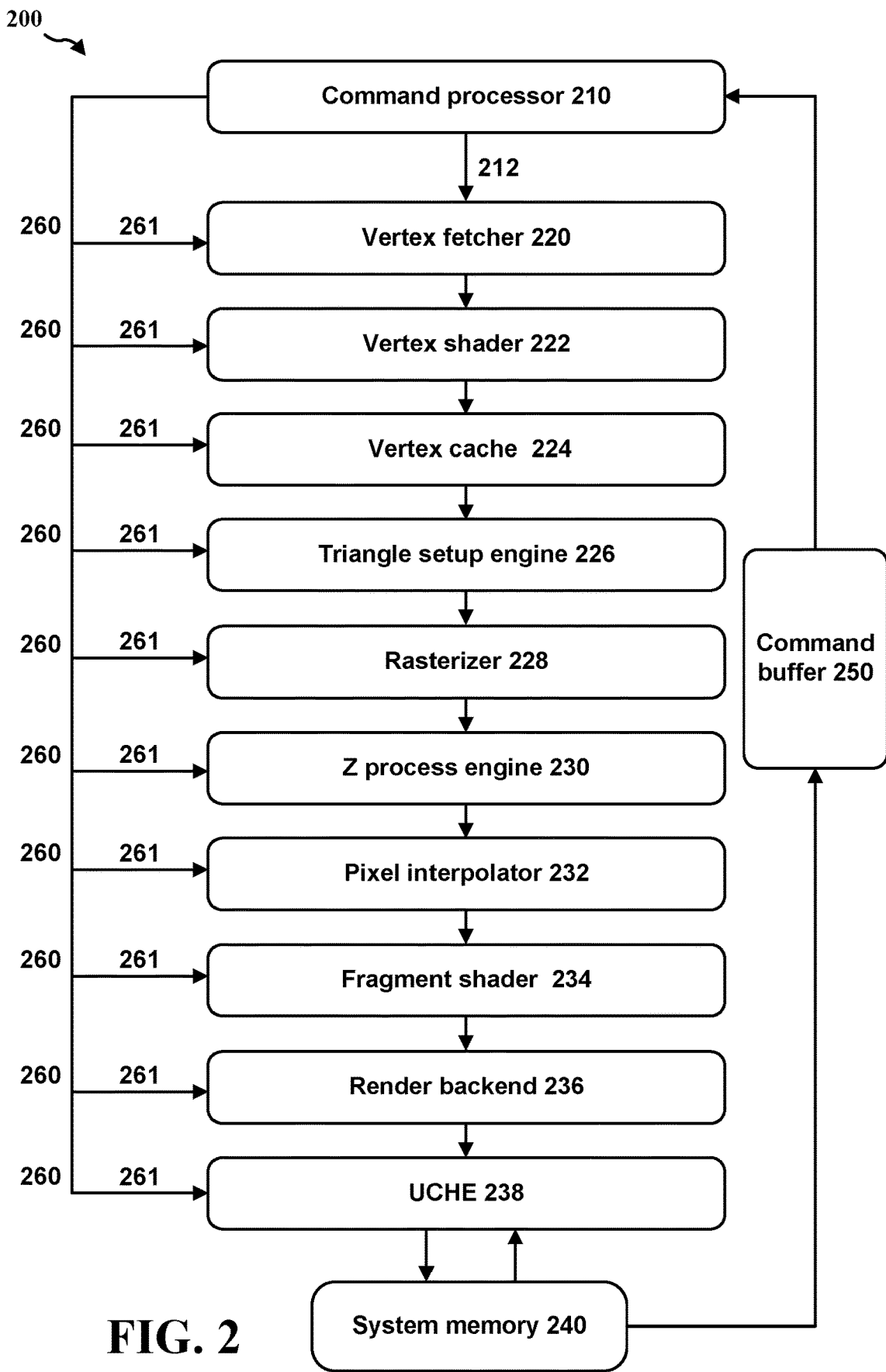
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1. GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
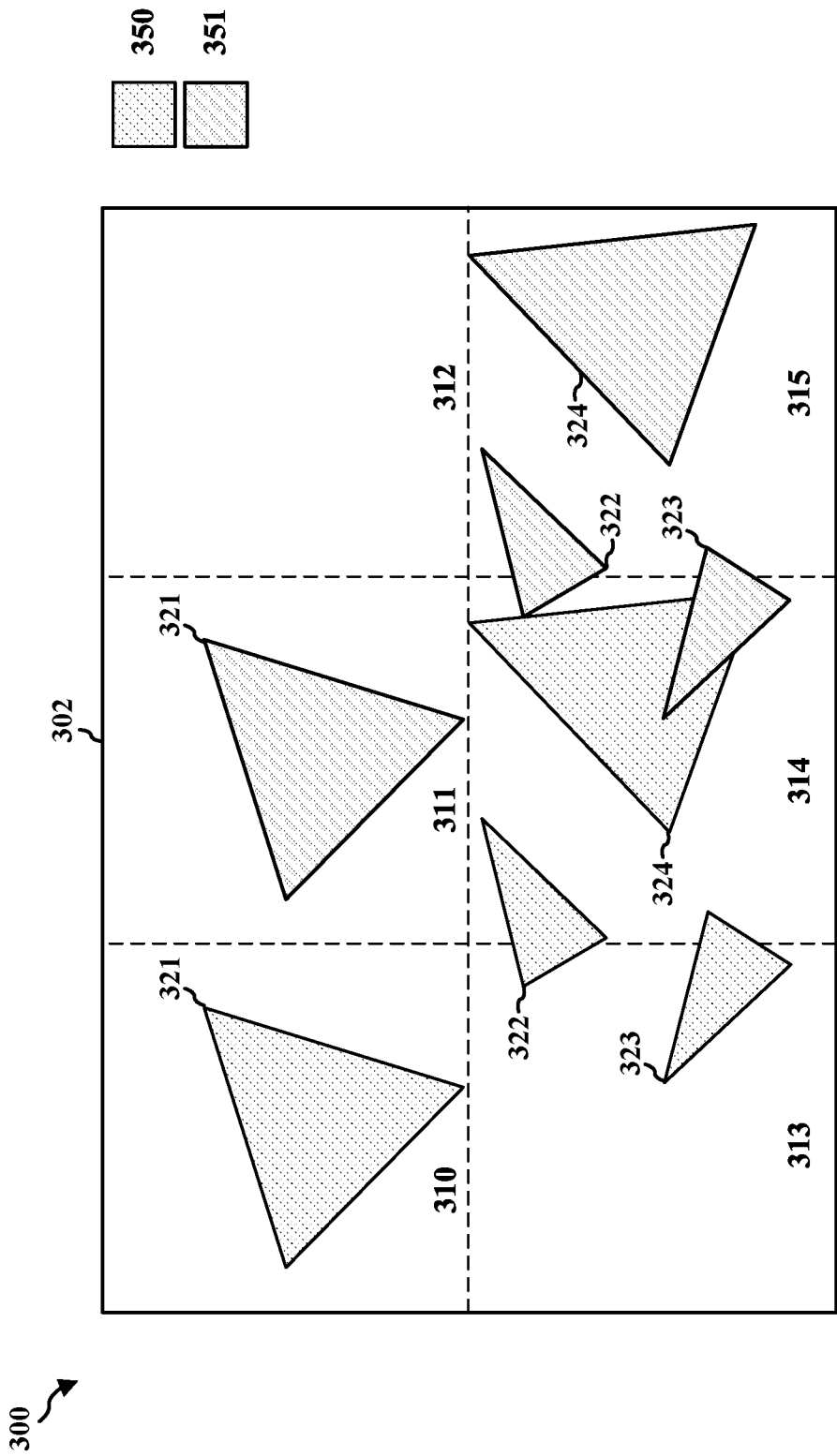
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Various technologies pertaining to improving performance of lossy bandwidth compression/decompression are disclosed herein. The improvements may be applied to lossy formats (e.g., red (R) green (G) blue (B) alpha (A) 8888 (RGBA8888) formats). Lossy bandwidth compression/decompression may be utilized by many different components of a device, such as a display, a GPU, a video decoder, a camera, and a CPU. Lossy bandwidth compression/decompression may be useful for SOCs, as SOCs may be configured to perform memory-intensive tasks in which memory bandwidth may be limited. Lossy bandwidth compression/decompression may help to conserve memory bandwidth by compressing surfaces stored in system memory. For instance, the surfaces may be compressed as the surfaces are written to main memory and read from main memory. In an example, the surfaces may be virtual reality (VR) surfaces associated with a VR application.

Lossy bandwidth compression/decompression may be associated with banding artifacts due to a truncation that occurs in a compression portion of lossy bandwidth compression/decompression. A banding artifact may refer to a form of posterization in a digital image caused by a color of each pixel in the digital image being rounded to a nearest digital color level. Dither may be utilized to reduce occurrence of banding artifacts. Dither may refer to an intentionally applied form of noise used to randomize quantization error in order to prevent the banding artifacts. Various dither approaches may be employed to mitigate banding artifacts, such as ordered dither approaches, error diffusion approaches, and frequency-based approaches.

S-CIELAB may refer to a spatial extension of the CIELAB color metric, developed by the International Commission on Illumination (CIE). S-CIELAB may be useful for measuring color reproduction errors of digital images. Given two images (one original and one compressed/reconstructed), S-CIELAB may calculate an error term ($\Delta E$) which correlates with human perception of error differences. The error term ($\Delta E$) may be on a per pixel basis for an image. A small value of $\Delta E$ may be imperceptible to a human observer while a large value of $\Delta E$ may be discriminated by the human observer. S-CIELAB may be used as an error metric to determine that a compression scheme is visually lossless. For instance, if $\Delta E=0$, a compression scheme is lossless. Over patterned regions of an image, reproduction errors measured using S-CIELAB may correspond to perceived color errors better than errors computed without S-CIELAB. Over uniform spatial regions of the image, errors computed with S-CIELAB may be equal to errors computed using CIELAB.

Figure 4:
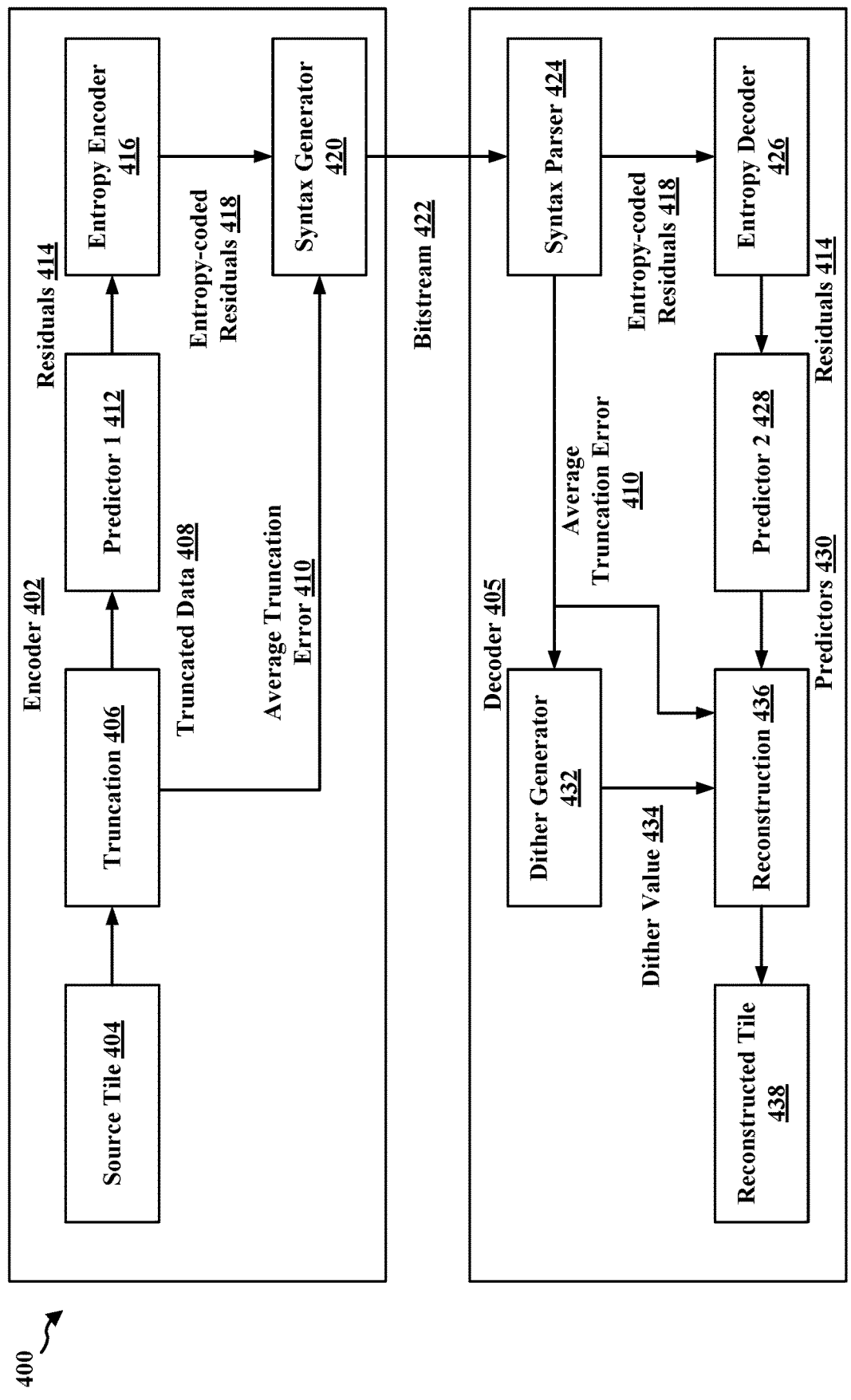
FIG. 4 is a diagram that illustrates an example of an encoder and a decoder.

FIG. 4 is a diagram 400 that illustrates an example of an encoder 402 and a decoder 405. The encoder 402 and the decoder 405 may leverage truncation error signaling and truncation-error adaptive dither (described in greater detail below). The encoder 402 and the decoder 405 may be included in the same device or different devices. In an example, the encoder 402 and/or the decoder 405 may be included in a CPU, a GPU, or a DPU. In an example, the encoder 402 and/or the decoder 405 may be included in a SOC. The encoder 402 and/or the decoder 405 may be associated with a codec. The encoder 402 and/or the decoder 405 may be associated with display processing, image processing, or data processing. The encoder 402 and the decoder 405 may be associated with a lossy compression scheme. Lossy compression (also referred to as irreversible compression) may refer to a form of compression that uses inexact approximations of content and partial data discarding to represent the content. Lossy compression may be associated with reduced data sizes for storing, handling, and transmitting the content. Lossless compression (also referred to as reversible compression) may refer to a form of compression that allows content to be reconstructed from compressed content without a loss of information. Lossy compression may provide for a greater amount of data reduction than lossless compression.

The encoder 402 may obtain a source tile 404. The source tile 404 may be or include an image, an image frame that is part of video content, an audio frame, or other data. In an example, the source tile 404 may be associated with display processing, image processing, or data processing. The encoder 402 may perform a truncation 406 (also referred to herein as "a truncation process") on the source tile 404. A truncation process may refer to removing one or more least-significant bits (LSBs) from data. The truncation 406 may produce truncated data 408. In an example, the source tile 404 may have a first number of bits and the truncated data 408 may have a second number of bits, where the first number of bits is greater than the second number of bits. In an example, the truncation 406 may truncate one or more least-significant bits (LSBs) associated with the source tile 404.

The truncation 406 may be associated with a truncation error for a sample. The truncation error for the sample may refer to a difference between an original version of the sample and a quantized/reconstructed version of the sample. The encoder 402 may compute a truncation error (TE) for a sample (s) with a quantization parameter (Q) according to equation (I) below.

$$TE(s)=s-((s>>Q)<<Q) \tag{I}$$

In equation (I), TE(s) may refer to a truncation error for a sample. The quantization parameter (Q) may enable a range of values associated with the sample to be compressed into a discrete value. As used herein, the symbol ">>" may refer to a right bit shift. In one aspect, the right bit shift may be an arithmetic right shift in which a least-significant bit is lost and a most-significant bit is copied. In one example, given a bit sequence "1001," a right bit shift of 1 (i.e., 1001>>1) may produce the bit sequence "1101." In another example, given a bit sequence "0011," a right bit shift of 2 (i.e., 0011>>2) may produce the bit sequence "0000." In yet another example, given a bit sequence "1011," a right bit shift of 2 (i.e., 1011>>2) may produce the bit sequence "10" (i.e., the right bit shift may directly reduce the number of bits). As used herein, the symbol "<<" may refer to a left bit shift in which a new least-significant bit with a value of "0" is added to a bit sequence and existing bits are promoted. In one example, given a bit sequence "1011," a left bit shift of 2 (i.e., 1011<<2) may produce the bit sequence "101100." The encoder 402 may compute (and signal) truncation error for both predicted and pulse coded modulation (PCM) operational modes. The predicted operational mode may refer to an operational mode in which a current sample is predicted with neighboring samples. The PCM operational mode may refer to an operational mode in which samples are directly truncated without prediction. The PCM operational mode may be useful in high entropy scenarios (i.e., scenarios involving difficult content) where prediction performance is not optimal. For instance, if residuals are one bit larger than original samples, the PCM operational mode may be utilized instead of the predicted operational mode. After accumulating truncation error over a subtile component (i.e., a group of samples) via equation (I), the encoder 402 may compute an average truncation error 410 for the subtile component (explained in greater detail below). Although the encoder 402 is described herein as computing an average truncation error 410 for the subtile component, the encoder may also compute at least one representative value that collectively represents truncation error for the subtile component. The average truncation error 410 may be an example of the at least one representative value; however, other types of truncation error values may be computed and utilized by the encoder 402.

Figure 5:
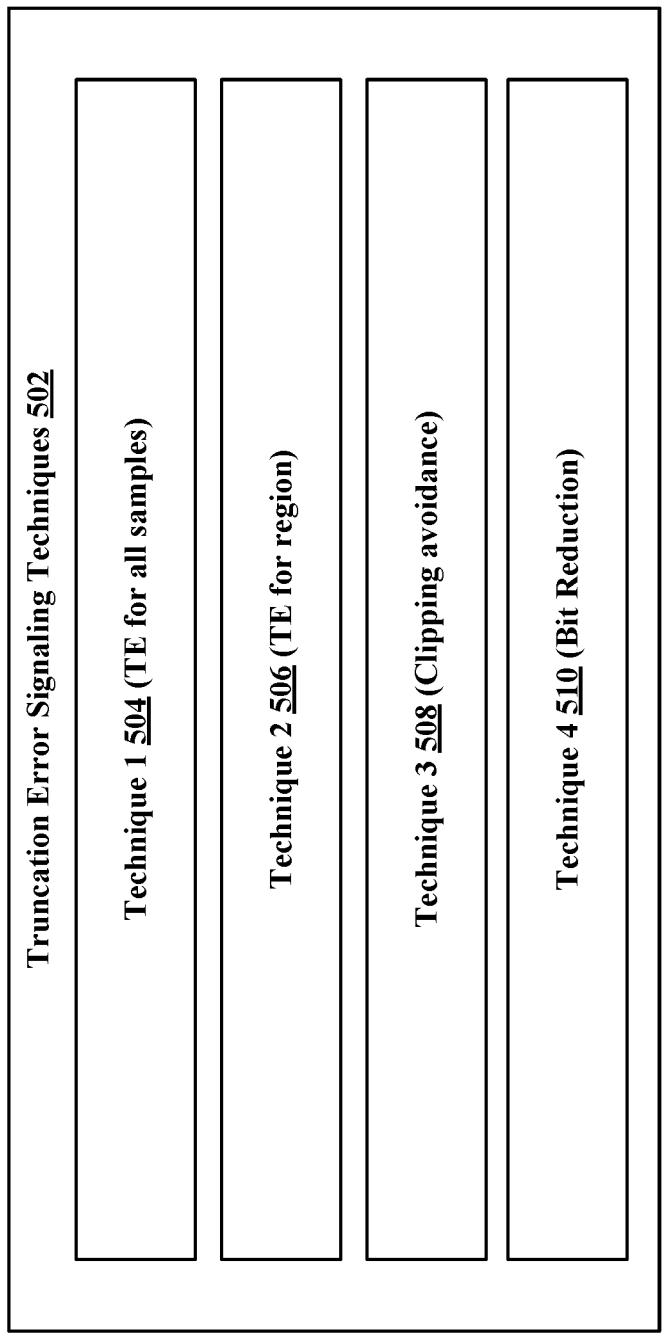
FIG. 5 is a diagram that illustrates examples of truncation error signaling techniques.

FIG. 5 is a diagram 500 that illustrates examples of truncation error signaling techniques 502. The truncation error signaling techniques 502 may be utilized by the encoder 402 in order to compute an average truncation error for data (e.g., the average truncation error 410 for the source tile 404). The truncation error signaling techniques 502 may include a first technique 504, a second technique 506, a third technique 508, and a fourth technique 510. In one aspect, the encoder 402 may select the first technique 504, the second technique 506, the third technique 508, or the fourth technique 510 based on a coding mode employed by the encoder 402.

In the first technique 504, the encoder 402 may compute a single value of average truncation error for each subtile component. As used herein, the term "subtile component" may refer to a group of samples. The subtile component may be associated with the source tile 404. Stated differently, the group of samples may be associated with the subtile component. The encoder 402 may compute an average truncation error value (e.g., the average truncation error 410) according to equation (II) below.

$$TE_{avg}=(TE_{M \times N}+\text{bias})>>\text{shift} \tag{II}$$

In equation (II), $TE_{avg}$ may refer to the average truncation error value for a subtile component. M×N may refer to dimensions of the subtile component (i.e., dimensions of a group of samples). M and N may be positive integers. In an example, M may correspond to a height of the samples and N may correspond to a width of the samples. $TE_{M \times N}$ may refer to a sum of truncation error for samples within the subtile component. The encoder 402 may compute the shift and the bias according to equations (III) and (IV) below, respectively.

$$\text{shift}=\log_2(MN) \tag{III}$$

$$\text{bias}=1<<(\log_2(MN)-1) \tag{IV}$$

In an example with respect to the first technique 504, the encoder 402 may compute an average truncation error value for a 16×4 subtile component (e.g., M=16 and N=4). The encoder 402 may compute the average truncation error value for the example according to equation (V) below.

$$TE_{avg}=(TE_{16 \times 4}+32)>>6 \tag{V}$$

In the second technique 506, multiple syntax elements of truncation error may be used for a single subtile component. The encoder 402 may define a size of a region within a subtile component as $M_0 \times N_0$, where $M_0 \leq M$ and $N_0 \leq N$. The encoder 402 may compute an average truncation error value (e.g., the average truncation error 410) according to equation (VI) below.

$$TE_{avg}=(TE_{M_0 \times N_0}+\text{bias})>>\text{shift} \tag{VI}$$

In equation (VI), $TE_{avg}$ may refer to the average truncation error value for a region within a subtile component. Furthermore, $TE_{M_0 \times N_0}$ may refer to a sum of truncation error for samples within the region within the subtile component. The encoder 402 may compute the shift and the bias in the second technique 506 according to equations (VII) and (VIII) below.

$$\text{shift}=\log_2(M_0 N_0) \tag{VII}$$

$$\text{bias}=1<<(\log_2(M_0 N_0)-1) \tag{VIII}$$

In an example with respect to the second technique 506, the encoder 402 may subdivide a 16×4 (i.e., M=16 and N=4) subtile component into four regions of size 4×4 (i.e., $M_0=4$ and $N_0=4$). The encoder 402 may compute the average truncation error value for the region within the subtile component for the example according to equation (IX) below.

$$TE_{avg}=(TE_{4 \times 4}+8)>>4 \tag{IX}$$

In the third technique 508, the encoder 402 may clip truncation error to avoid using Q+1 bits for signaling. For instance, the encoder 402 may compute an average truncation error value (e.g., the average truncation error 410) according to equation (X) below.

$$TE_{avg}=\min((1<<Q)-1,(TE_{M \times N}+\text{bias})>>\text{shift}) \tag{X}$$

In the fourth technique 510, the encoder 402 may modify a computed average truncation error value in order to reduce a number of bits used for signaling. The encoder 402 may perform the modification when Q is greater than a given threshold (i.e., $Q > Q_T$). The encoder 402 may apply an additional quantization parameter ($Q_{extra}$) to an average truncation error value. For instance, the encoder 402 may compute an average truncation error value (e.g., the average truncation error 410) according to equations (XI), (XII), and (XIII) below.

$$TE_{avg} = (TE_{M \times N} + \text{bias}) >> \text{shift} \tag{XI}$$

$$\text{shift} = \log_2(MN) + Q_{extra} \tag{XII}$$

$$\text{bias} = 1 << (\log_2(MN) + Q_{extra} - 1) \tag{XIII}$$

In the fourth technique 510, the encoder 402 may signal $TE_{avg} >> Q_{extra}$ to the decoder 405. In an example in which $Q_{extra}$ is "1," $TE_{avg}$ may be modified as ($TE_{avg} >> 1$) before signaling (i.e., a signal with one fewer bit). During reconstruction, the decoder 405 may add a bit back. For instance, the decoder 405 may compensate by modifying a parsed value of $TE_{avg}$ for a case where $Q > Q_T$ (i.e., $TE_{avg} <<= Q_{extra}$). $TE_{avg} <<= Q_{extra}$ may be equivalent to $TE_{avg} = TE_{avg} << Q_{extra}$ (i.e., the parsed value of $TE_{avg}$ may be left-shifted by $Q_{extra}$ bits before being used for reconstruction).

Referring back to FIG. 5, a first predictor 412 of the encoder 402 may receive the truncated data 408 generated by the truncation 406. The first predictor 412 may generate residuals 414 (i.e., a set of residual samples) for the truncated data 408 based on the truncated data 408. An entropy encoder 416 of the encoder 402 may apply an entropy encoding to the residuals 414 to generate entropy-coded residuals 418 (i.e., an encoded set of residual samples for the truncated data 408). In an example, the entropy-coded residuals 418 may be block fixed length coding (BFLC) encoded prediction residuals.

A syntax generator 420 of the encoder 402 may receive the entropy-coded residuals 418 and the average truncation error 410. The syntax generator 420 may generate a bitstream 422 based on the average truncation error 410 and the entropy-coded residuals 418. The bitstream 422 may include the average truncation error 410 and the entropy-coded residuals 418. The bitstream 422 may also include block lengths associated with the entropy-coded residuals 418 (e.g., BFLC block lengths) and additional syntax in a tile header.

The encoder 402 may provide the bitstream 422 to the decoder 405. In one example, the encoder 402 (or a device or software associated with the encoder 402) may transmit the bitstream 422 to the decoder 405 via a wired connection. In another example, the encoder 402 (or the device or the software associated with the encoder 402) may transmit the bitstream 422 to the decoder 405 via a wireless connection.

A syntax parser 424 of the decoder 405 may obtain the bitstream 422. The syntax parser 424 may parse the entropy-coded residuals 418 and the average truncation error 410 from the bitstream 422. An entropy decoder 426 of the decoder 405 may apply an entropy decoding to the entropy-coded residuals 418 to generate the residuals 414. A second predictor 428 of the decoder 405 may generate a predictor 430 based on the residuals 414.

A dither generator 432 of the decoder 405 may obtain the average truncation error 410 (parsed via the syntax parser 424). The dither generator 432 may determine a dither value 434 (e.g., an ordered dither value) based on the average truncation error 410 and the quantization parameter (Q) discussed above. The dither value 434 may be obtained from a dither matrix (explained in greater detail below). Aspects of the dither generator 432 will be discussed in greater detail below.

The decoder 405 may perform a reconstruction 436 to generate a reconstructed tile 438, where the reconstructed tile 438 may be a reconstructed version of the source tile 404. The reconstruction 436 may be based on the dither value 434, the average truncation error 410, the predictor 430, and the residuals 414. For instance, the decoder 405 may perform the reconstruction 436 via equation (XIV).

$$s_{rec} = ((p + res) << Q) + TE_{avg} + D_{scaled} \tag{XIV}$$

In equation (XIV), $s_{rec}$ may refer to a reconstructed sample value (e.g., the reconstructed tile 438), p may be a predictor (e.g., the predictor 430), res may be a signaled residual (e.g., the residuals 414 produced by the entropy decoder 426), Q may be the quantization parameter, $TE_{avg}$ may be the average truncation error 410 parsed from the bitstream 422, and $D_{scaled}$ may be a dither matrix from which the dither value 434 is obtained. The reconstructed tile 438 may be associated with fewer block artifacts in comparison to a tile that is reconstructed using a different technique than the techniques described herein.

Figure 6:
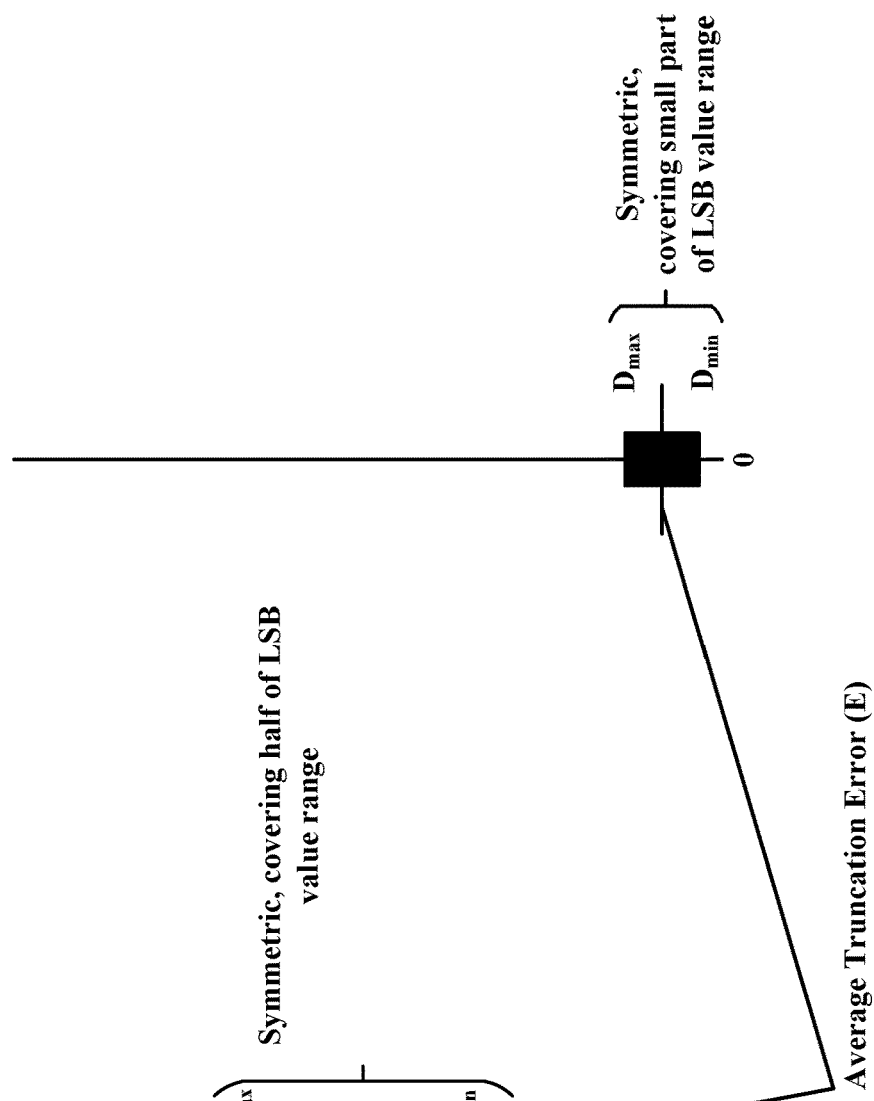
FIG. 6 is a diagram that illustrates example aspects of adaptive dither based on truncation error.

FIG. 6 is a diagram 600 that illustrates example aspects of adaptive dither based on truncation error. The decoder 405 may utilize dither (e.g., ordered dither) in order to reduce visual artifacts associated with the truncation 406 described above. A strength of a dither matrix may be adaptive based on an average truncation error value of a subtle component (or a region within a subtle component). The diagram 600 includes a first example 602 and a second example 604.

The first example 602 may correspond to a truncated LSB value range of 0 to $(1<<M)-1$. In an example, M may be a quantization parameter, such as the quantization parameter Q described above in connection with FIGS. 4 and 5. In the first example 602, an average truncation error (e.g., the average truncation error 410) may be around half of the truncated LSB value range. In the first example 602, a dither strength ($D_{min}$, $D_{max}$) may be a function of the average truncation error. The dither strength ($D_{min}$, $D_{max}$) may correspond to added noise. In the first example 602, the dither strength may be symmetric around a reconstruction point (corresponding to the average truncation error) and may cover around half of the truncated LSB value range. The dither strength may be symmetric around the reconstruction point in order to avoid biasing a reconstructed signal and to maintain the same level of truncation error on average. In the first example 602, the dither strength may be maximized for truncation error around half of a dynamic range (i.e., the truncated LSB value range). The second example 604 may correspond to a truncated LSB value range of 0 to $(1<<M)-1$. In an example, M may be a quantization parameter, such as the quantization parameter Q described above in connection with FIGS. 4 and 5. In the second example 604, an average truncation error (e.g., the average truncation error 410) may be close to 0. In the second example 604, the dither strength ($D_{min}$, $D_{max}$) may be a function of the average truncation error. The dither strength ($D_{min}$, $D_{max}$) may correspond to added noise. In the second example 604, the dither strength may be symmetric around a reconstruction point (corresponding to the average truncation error) and may be a relatively small part of the truncated LSB value range. The dither strength may be symmetric around the reconstruction point in order to avoid biasing a reconstructed signal and to maintain the same level of truncation error on average. In the second example 604, the dither strength may be minimized for truncation error close to zero or truncation error close to (1<<M)−1.

Referring back to FIG. 4, in one aspect, the dither generator 432 of the decoder 405 may determine a dither matrix $D_{scaled}$ based on a quantization parameter (e.g., Q) and a magnitude of the average truncation error ($TE_{avg}$) for each 4×4 region associated with the source tile 404 by a dither strength parameter ($d_{max}$) described in Table 1 below.

TABLE 1

Mapping between average truncation error and dither strength parameter $d_{max}$ for a selection of quantization parameters Q

| Q | $TE_{avg}$ Range | $d_{max}$ |
|---|---|---|
| x | $TE_{avg} = 0$ | 0 |
| x | $TE_{avg} = (1 << Q) - 1$ | 0 |
| 1 | x | 0 |
| 2 | x | 0 |
| 3 | $1 \leq TE_{avg} \leq 6$ | 1 |
| 4 | $1 \leq TE_{avg} < 3$ | $TE_{avg}$ |
| 4 | $3 \leq TE_{avg} \leq 12$ | 3 |
| 4 | $12 < TE_{avg} \leq 14$ | $15 - TE_{avg}$ |
| 5 | $1 \leq TE_{avg} < 7$ | $TE_{avg}$ |
| 5 | $7 \leq TE_{avg} \leq 24$ | 7 |
| 5 | $24 < TE_{avg} \leq 30$ | $31 - TE_{avg}$ |

In one aspect, the dither generator 432 of the decoder 405 may determine the dither strength parameter ($d_{max}$) based on the average truncation error ($TE_{avg}$) and the quantization parameter (Q) procedurally according to equations (XV), (XVI), and (XVII) below.

$$d_{max} = \begin{cases} TE_{avg}, & TE_{avg} < \alpha \\ \alpha, & \alpha \leq TE_{avg} \leq \beta \\ ((1 << Q) - 1) - TE_{avg}, & TE_{avg} > \beta \end{cases} \quad (XV)$$

$$\alpha = (1 << (Q - 2)) - 1 \quad (XVI)$$

$$\beta = ((1 << Q) - 1) - \alpha \quad (XVII)$$

After the dither generator 432 of the decoder 405 determines the dither strength parameter $d_{max}$ (either via Table 1 or procedurally via equations (XV), (XVI), and (XVII)), the dither generator 432 may compute a scaled dither matrix ($D_{scaled}$) based on a base dither matrix ($D_{base}$) and the dither strength parameter $d_{max}$. Equations (XVIII) and (XIX) below provide for the computation of the scaled dither matrix $D_{scaled}$ and the base dither matrix $D_{base}$.

$$D_{scaled} = (D_{base} \cdot d_{max} + 4) >> 3 \quad (XVIII)$$

$$D_{base} = \begin{bmatrix} -8 & 1 & -6 & 3 \\ 5 & -4 & 7 & -2 \\ -5 & 4 & -7 & 2 \\ 8 & -1 & 6 & -3 \end{bmatrix} \quad (XIX)$$

Although $D_{base}$ in equation (XIX) is a 4×4 matrix, other possibilities are contemplated. For instance, the decoder 405 may utilize a different sized $D_{base}$ based on M and N (described above). Furthermore, in equation (XVIII) above, "+4" may facilitate rounding and ">>3" may reduce a range of $D_{scaled}$.

The dither generator 432 of the decoder 405 may determine the dither value 434 for a given sample during reconstruction by sampling $D_{scaled}$ at a position of sample ($s_y$, $s_x$) within a subtile component ($s_y$ % 4, $s_x$ % 4). The symbol "%" may refer to a modulo operator. As noted above, the decoder 405 may generate the reconstructed tile 438 based on the dither value 434, the average truncation error 410, the predictor 430, and the residuals 414.

In one aspect, the encoder 402 may signal additional average truncation error in order to improve performance. For instance, the encoder 402 may signal one average truncation error value for each M×N region. Signaling additional average error may improve performance when the quantization parameter Q is relatively high. In one aspect, the decoder 405 may rotate the base dither matrix $D_{base}$ to produce an equally performant matrix. In one aspect, the decoder 405 may compute the dither strength to be asymmetric around a reconstruction point (corresponding to the average truncation error). For instance, if the average truncation error ($TE_{avg}$) is close to 0 or close to (1<<Q)−1, the decoder 405 may allow the dither strength to be asymmetric to provide for greater dither strength near 0 or near (1<<Q)−1.

In comparison to other compression/decompression schemes, the aspects described above may be associated with reduced error metrics, such as reduced mean squared error (MSE) metrics or reduced S-CIELAB metrics.

Figure 7:
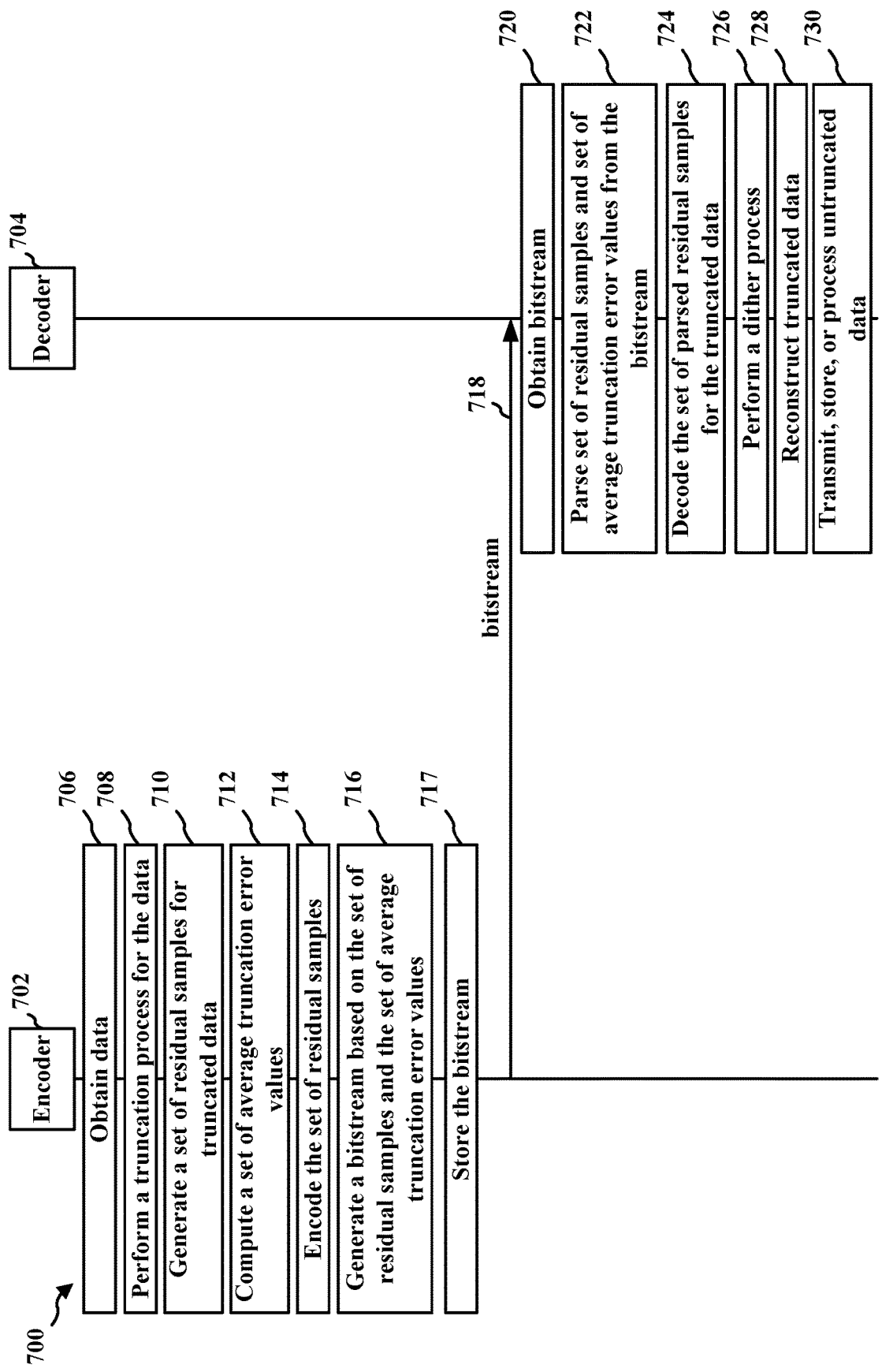
FIG. 7 is a call flow diagram illustrating example communications between an encoder and a decoder in accordance with one or more techniques of this disclosure.

FIG. 7 is a call flow diagram 700 illustrating example communications between an encoder 702 and a decoder 704 in accordance with one or more techniques of this disclosure. In an example, the encoder 702 and/or the decoder 704 may be included in a DPU, a GPU, or a CPU. The encoder 702 and the decoder 704 may be within the same device or the encoder 702 and the decoder 704 may be within different devices. In an example, the encoder 702 may be or include the encoder 402 and the decoder 704 may be or include the decoder 405.

At 706, the encoder 702 may obtain data that may be associated with data processing, image processing, or display processing. At 708, the encoder 702 may perform a truncation process for the data that results in truncated data. At 710, the encoder 702 may generate a set of residual samples for the truncated data. At 712, the encoder 702 may compute a set of average truncation error values associated with the truncation process for the truncated data. At 714, the encoder 702 may encode the set of residual samples for the truncated data. At 716, the encoder 702 may generate a bitstream based on the set of residual samples and the set of average truncation error values. At 717, the encoder 702 may store the bitstream. At 718, the encoder 702 may transmit the bitstream to the decoder 704.

Figure 8:
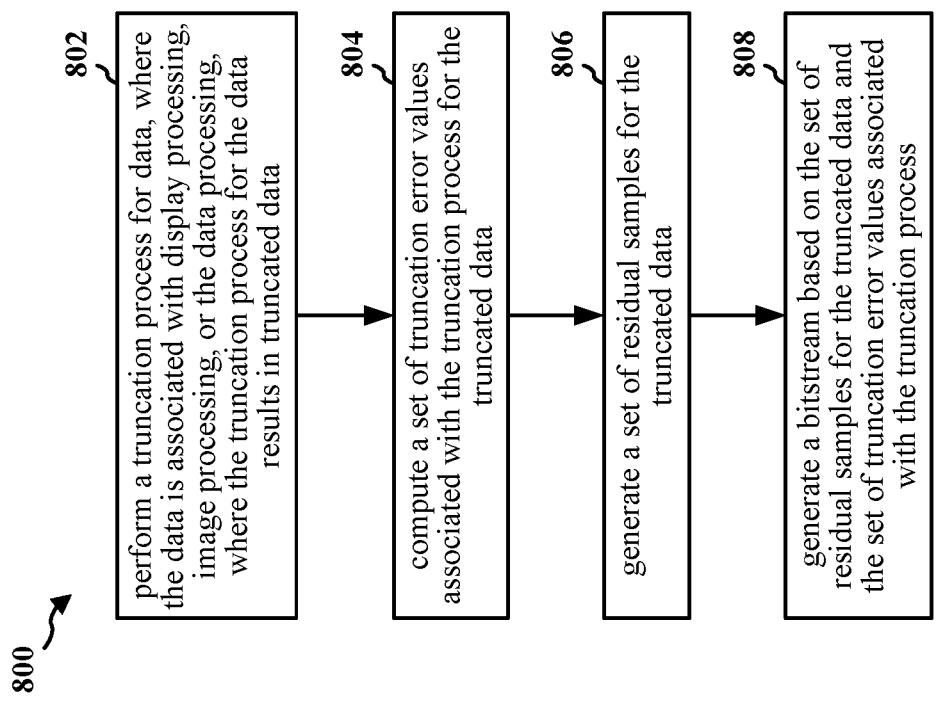
FIG. 8 is a flowchart of an example method of data processing in accordance with one or more techniques of this disclosure.

At 720, the decoder 704 may obtain the bitstream that is associated with the set of residual samples for the truncated data and the set of average truncation error values for the truncation process performed at 708. The bitstream may correspond to the data associated with the data processing, the image processing, or the display processing. At 722, the decoder 704 may parse the set of residual samples and the set of average truncation error values from the bitstream. At 724, the decoder 704 may decode the set of parsed residual samples for the truncated data. At 726, the decoder 704 may perform a dither process for the truncated data based on the set of average truncation error values. At 728, the decoder 704 may reconstruct the truncated data based on the dither process and the set of decoded residual samples. Reconstruction of the truncated data may result in untruncated data. At 730, the decoder 704 may transmit, store, or process the untruncated data after reconstructing the truncated data. FIG. 8 is a flowchart 800 of an example method of data processing in accordance with one or more techniques of this disclosure. The method may be performed by an apparatus, such as an apparatus for data processing, a GPU, a CPU, a display processing unit (DPU) or other display processor, a wireless communication device, and the like, as used in connection with the aspects of FIGS. 1-7. The method may be performed by the encoder 402 or the encoder 702. The method may be associated with various advantages, such as a reduction in visual artifacts produced as a by-product of a compression/decompression process. In an example, the method may be performed by the compressor/decompressor 198.

At 802, the apparatus performs a truncation process for data, where the data is associated with display processing, image processing, or data processing, where the truncation process for the data results in truncated data. For example, FIG. 7 at 708 shows that the encoder 702 may perform a truncation process for data, where the data may be associated with display processing, image processing, or data processing. In another example, FIG. 4 shows that the encoder 402 may perform a truncation 406 on the source tile 404 (i.e., data). In a further example, the truncated data may be the truncated data 408. In an example, 802 may be performed by the compressor/decompressor 198.

At 804, the apparatus computes a set of truncation error values associated with the truncation process for the truncated data. For example, FIG. 7 at 712 shows that the encoder 702 may compute a set of average truncation error values associated with the truncation process for the truncated data performed at 708. In another example, the set of truncation error values may be or include the average truncation error 410. In a further example, the apparatus may compute the set of truncation error values using one or more of the truncation error signaling techniques 502. In yet another example, the set of truncation error values may correspond to $TE_{avg}$ described above. In an example, 804 may be performed by the compressor/decompressor 198.

At 806, the apparatus generates a set of residual samples for the truncated data. For example, FIG. 7 at 710 shows that the encoder 702 may generate a set of residual samples for truncated data. In a further example, FIG. 7 at 714 shows that the encoder 702 may encode a set of residual samples for the truncated data. In another example, FIG. 4 shows that the encoder 402 may encode the residuals 414 to generate the entropy-coded residuals 418. In an example, 806 may be performed by the compressor/decompressor 198.

At 808, the apparatus generates a bitstream based on the set of residual samples for the truncated data and the set of truncation error values associated with the truncation process. For example, FIG. 7 at 716 shows that the encoder 702 may generate a bitstream based on a set of residual samples and a set of average truncation error values. In another example, the bitstream may be the bitstream 422. In an example, 808 may be performed by the compressor/decompressor 198.

Figure 9:
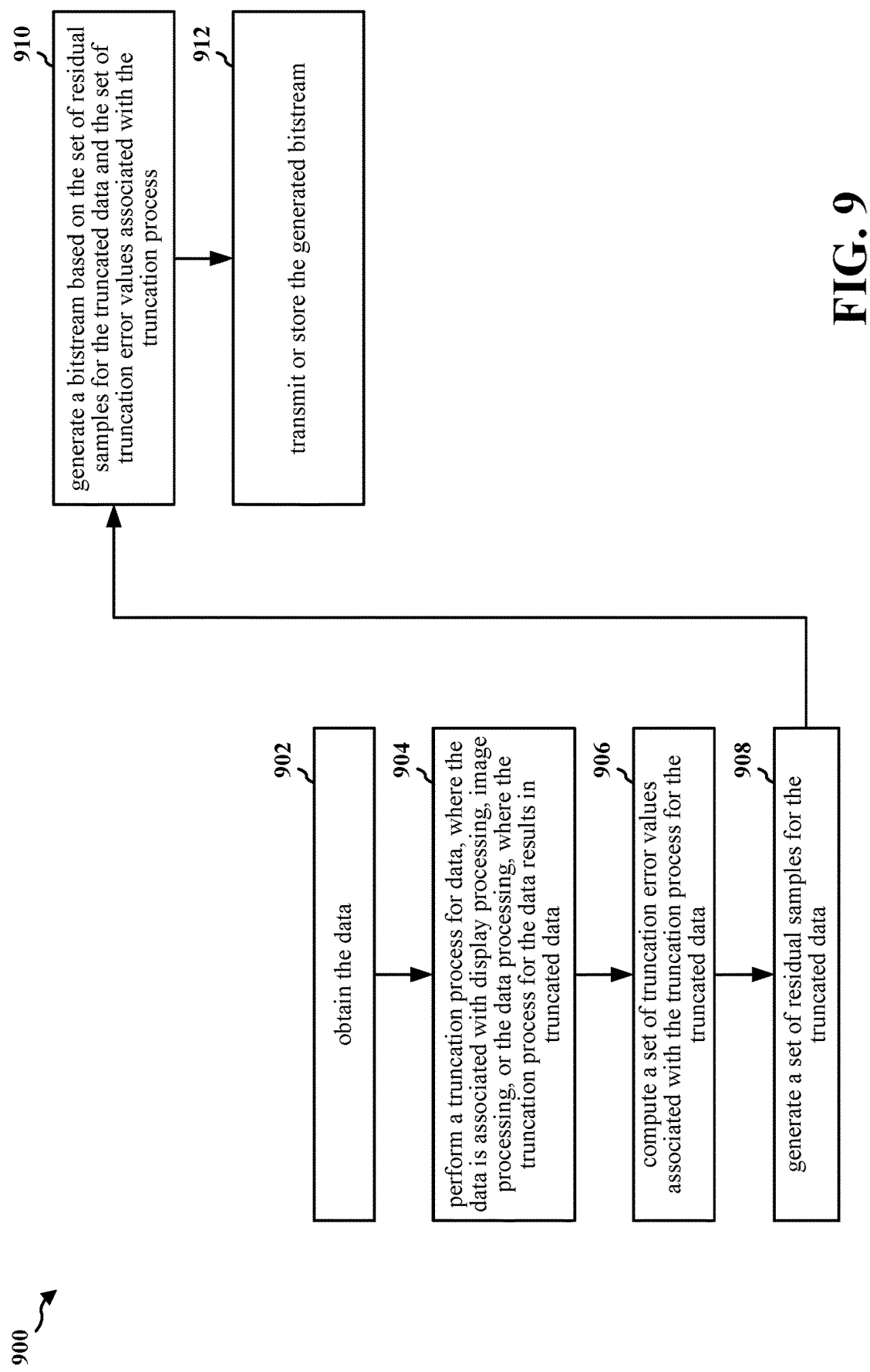
FIG. 9 is a flowchart of an example method of data processing in accordance with one or more techniques of this disclosure.

FIG. 9 is a flowchart 900 of an example method of data processing in accordance with one or more techniques of this disclosure. The method may be performed by an apparatus, such as an apparatus for data processing, a GPU, a CPU, a DPU or other display processor, a wireless communication device, and the like, as used in connection with the aspects of FIGS. 1-7. The method may be performed by the encoder 402 or the encoder 702. The method may be associated with various advantages, such as a reduction in visual artifacts produced as a by-product of a compression/decompression process. In an example, the method (including the various aspects detailed below) may be performed by the compressor/decompressor 198.

At 904, the apparatus performs a truncation process for data, where the data is associated with display processing, image processing, or data processing, where the truncation process for the data results in truncated data. For example, FIG. 7 at 708 shows that the encoder 702 may perform a truncation process for data, where the data may be associated with display processing, image processing, or data processing. In another example, FIG. 4 shows that the encoder 402 may perform a truncation 406 on the source tile 404 (i.e., data). In a further example, the truncated data may be the truncated data 408. In an example, 904 may be performed by the compressor/decompressor 198.

At 906, the apparatus computes a set of truncation error values associated with the truncation process for the truncated data. For example, FIG. 7 at 712 shows that the encoder 702 may compute a set of average truncation error values associated with the truncation process for the truncated data performed at 708. In another example, the set of truncation error values may be or include the average truncation error 410. In a further example, the apparatus may compute the set of truncation error values using one or more of the truncation error signaling techniques 502. In yet another example, the set of truncation error values may correspond to $TE_{avg}$ described above. In an example, 906 may be performed by the compressor/decompressor 198.

At 908, the apparatus generates a set of residual samples for the truncated data. For example, FIG. 7 at 710 shows that the encoder 702 may generate a set of residual samples for truncated data. In a further example, FIG. 7 at 714 shows that the encoder 702 may encode a set of residual samples for the truncated data. In another example, FIG. 4 shows that the encoder 402 may encode the residuals 414 to generate the entropy-coded residuals 418. In an example, 908 may be performed by the compressor/decompressor 198.

At 910, the apparatus generates a bitstream based on the set of residual samples for the truncated data and the set of truncation error values associated with the truncation process. For example, FIG. 7 at 716 shows that the encoder 702 may generate a bitstream based on a set of residual samples and a set of average truncation error values. In another example, the bitstream may be the bitstream 422. In an example, 910 may be performed by the compressor/decompressor 198.

In one aspect, at 912, the apparatus may transmit or store the generated bitstream. For example, FIG. 7 at 717 shows that the encoder 702 may store the bitstream generated at 716. In another example, FIG. 7 at 718 shows that the encoder 702 may transmit the bitstream to the decoder 704. In a further example, FIG. 4 shows that the encoder 402 may provide the bitstream 422 to the decoder 405. In an example, 912 may be performed by the compressor/decompressor 198.

In one aspect, transmitting the generated bitstream may include transmitting the generated bitstream from an encoding device to a decoding device, or storing the generated bitstream may include storing the generated bitstream in a memory or a second memory, a cache, or a buffer associated with the encoding device. For example, the encoder 702 may be included in an encoding device and the decoder 704 may be included in a decoded device. In another example, storing the bitstream at 717 may include storing the generated bitstream in a memory or a second memory, a cache, or a buffer associated with the encoder 702. In a further example, the generated bitstream may be stored in one or more of the internal memory 121, the system memory 124, the internal memory 123, or the command buffer 250.

In one aspect, performing the truncation process for the data may include performing at least one bit shift operation on a sample of the data based on a quantization parameter. For example, the truncation process for the data may be performed in accordance with equation (I) above.

In one aspect, computing the set of truncation error values associated with the truncation process for the truncated data may include computing an average truncation error value based on a sum of truncation errors for a group of samples associated with one or more of the data, a shift, a bias, and at least one bit shift operation. For example, the set of truncation error values may be computed in accordance with equations (II), (III), and (IV) above. For example, computing the set of truncation error values may include aspects described above in relation to the first technique 504.

In one aspect, computing the set of truncation error values associated with the truncation process for the truncated data may include computing an average truncation error value based on a sum of truncation errors for samples in a region within a group of samples associated with one or more of the data, a shift, a bias, and at least one bit shift operation. For example, the set of truncation error values may be computed in accordance with equations (VI), (VII), and (VIII) above. For example, computing the set of truncation error values may include aspects described above in relation to the second technique 506.

In one aspect, computing the set of truncation error values associated with the truncation process for the truncated data may include computing an average truncation error value and computing the average truncation error value may include computing a first average truncation error value based on at least one of a quantization parameter, a first value, and a first at least one bit shift operation. For example, the first average truncation error value may be $(1<<Q))-1$ as shown in equation (X) above. For example, computing the set of truncation error values may include aspects described above in relation to the third technique 508.

In one aspect, computing the set of truncation error values associated with the truncation process for the truncated data may include computing an average truncation error value and computing the average truncation error value may include computing a second average truncation error value based on a sum of truncation errors for a group of samples associated with one or more of the data, a bias, a shift, and a second at least one bit shift operation. For example, the second average truncation error value may be $(TE_{M \times N}+bias)$ $>>shift$ as shown in equation (X) above. For example, computing the set of truncation error values may include aspects described above in relation to the third technique 508.

In one aspect, computing the set of truncation error values associated with the truncation process for the truncated data may include computing an average truncation error value and computing the average truncation error value may include selecting a lesser of the first average truncation error value or the second average truncation error value to serve as the average truncation error value. For example, the set of truncation error values may be computed in accordance with equation (X) above. In an example, the "min" operation in equation (X) may select the lesser of the first average truncation error value or the second average truncation error value to serve as the average truncation error value. For example, computing the set of truncation error values may include aspects described above in relation to the third technique 508.

In one aspect, computing the set of truncation error values associated with the truncation process for the truncated data may include computing an average truncation error value based on a sum of truncation errors for a group of samples associated with one or more of the data, a shift, a bias, a quantization parameter factor, and at least one bit shift operation. For example, the set of truncation error values may be computed in accordance with equations (XI), (XII), and (XIII) above. For example, computing the set of truncation error values may include aspects described above in relation to the fourth technique 510.

In one aspect, the average truncation error value may be computed based on the sum of the truncation errors for the group of samples, the shift, the bias, the quantization parameter factor, and the at least one bit shift operation if a quantization parameter is greater than a threshold quantization parameter. For example, the quantization parameter may be Q above and the threshold quantization parameter may be $Q_T$ above. For example, computing the set of truncation error values may include aspects described above in relation to the fourth technique 510.

In one aspect, the set of truncation error values for the truncation process in the bitstream may include an average truncation error value for each region within a group of samples associated with the data. For example, the average truncation error 410 may include an average truncation error value for each region within a group of samples associated with the data. In another example, the region may be defined by M and N as described above.

In one aspect, generating the set of residual samples for the truncated data may include encoding the set of residual samples for the truncated data. For example, FIG. 7 at 710 shows that the encoder 702 may generate a set of residual samples for the truncated data and the set of residuals samples may be encoded at 714. In another example, the set of residual samples may be the residuals 414.

In one aspect, encoding the set of residual samples for the truncated data may include entropy encoding the set of residual samples for the truncated data. For example, encoding the set of residual samples at 714 may include entropy encoding the set of residual samples. In another example, the entropy encoder 416 may encode the residuals 414 to generate the entropy-coded residuals 418.

In one aspect, at 902, the apparatus may obtain the data. For example, FIG. 7 at 706 shows that the encoder 702 may obtain data. In an example, 902 may be performed by the compressor/decompressor 198.

In one aspect, obtaining the data may include: receiving the data from a GPU, a CPU, or a camera. For example, obtaining the data at 706 may include receiving the data from a GPU, a CPU, or a camera. In another example, the GPU, the CPU, or the camera may be included in the device 104.

In one aspect, computing the set of truncation error values may include computing at least one representative value that collectively represents the set of truncation error values. For example, the at least one representative value may include the average truncation error 410. In another example, the at least one representative value may be the set of average truncation error values computed at 712.

Figure 10:
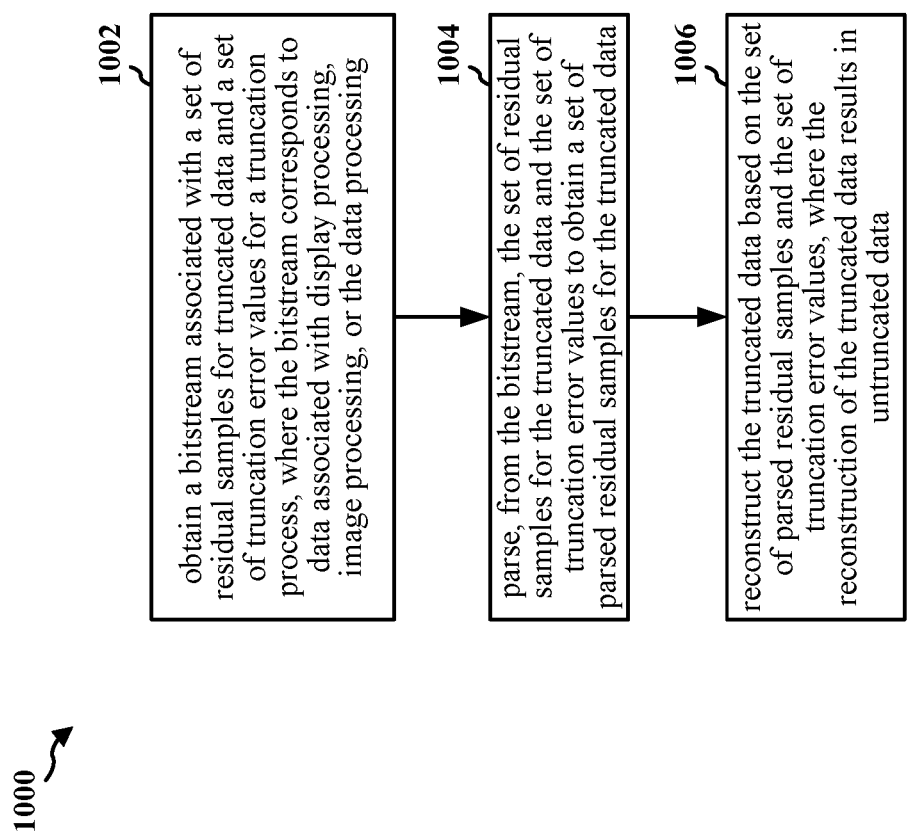
FIG. 10 is a flowchart of an example method of data processing in accordance with one or more techniques of this disclosure.

FIG. 10 is a flowchart 1000 of an example method of data processing in accordance with one or more techniques of this disclosure. The method may be performed by an apparatus, such as an apparatus for data processing, a GPU, a CPU, a DPU or other display processor, a wireless communication device, and the like, as used in connection with the aspects of FIGS. 1-7. The method may be performed by the decoder 405 or the decoder 704. The method may be associated with various advantages, such as a reduction in visual artifacts produced as a by-product of a compression/decompression process. In an example, the method may be performed by the compressor/decompressor 198.

At 1002, the apparatus obtains a bitstream associated with a set of residual samples for truncated data and a set of truncation error values for a truncation process, where the bitstream corresponds to data associated with display processing, image processing, or data processing. For example, FIG. 7 at 720 shows that the decoder 704 may obtain a bitstream associated with a set of residual samples for truncated data and a set of average truncation error values for a truncation process, where the bitstream corresponds to data associated with display processing, image processing, or data processing. In an example, the bitstream may be the bitstream 422, the set of residual samples for the truncated data may be the residuals 414 (or the entropy-coded residuals 418), the set of truncation error values may be or include the average truncation error 410, the truncation process may be the truncation 406, and the truncated data may be the truncated data 408. In an example, 1002 may be performed by the compressor/decompressor 198.

At 1004, the apparatus parses, from the bitstream, the set of residual samples for the truncated data and the set of truncation error values to obtain a set of parsed residual samples for the truncated data. For example, FIG. 7 at 722 shows that the decoder 704 may parse the set of residual samples and the set of average truncation error values from the bitstream. In another example, FIG. 4 shows that the syntax parser 424 of the decoder 405 may parse the bitstream 422 for the average truncation error 410 and the entropy-coded residuals 418. For example, FIG. 7 at 724 shows that the decoder 704 may decode the set of parsed residual samples for the truncated data. In another example, FIG. 4 shows that the entropy decoder 426 may decode the entropy-coded residuals 418 to obtain the residuals 414. In an example, 1004 may be performed by the compressor/decompressor 198.

At 1006, the apparatus reconstructs the truncated data based on the set of decoded residual samples and the set of truncation error values, where the reconstruction of the truncated data results in untruncated data. For example, FIG. 7 at 728 shows that the decoder 704 may reconstruct truncated data based on the set of decided residual samples obtained at 724 and the set of average truncation error values parsed from the bitstream at 722. FIG. 4 also shows that the reconstruction 436 may generate a reconstructed tile 438 (i.e., untruncated data). In a further example, the apparatus may reconstruct the truncated data in accordance with equation (XIV) above. In an example, 1006 may be performed by the compressor/decompressor 198.

Figure 11:
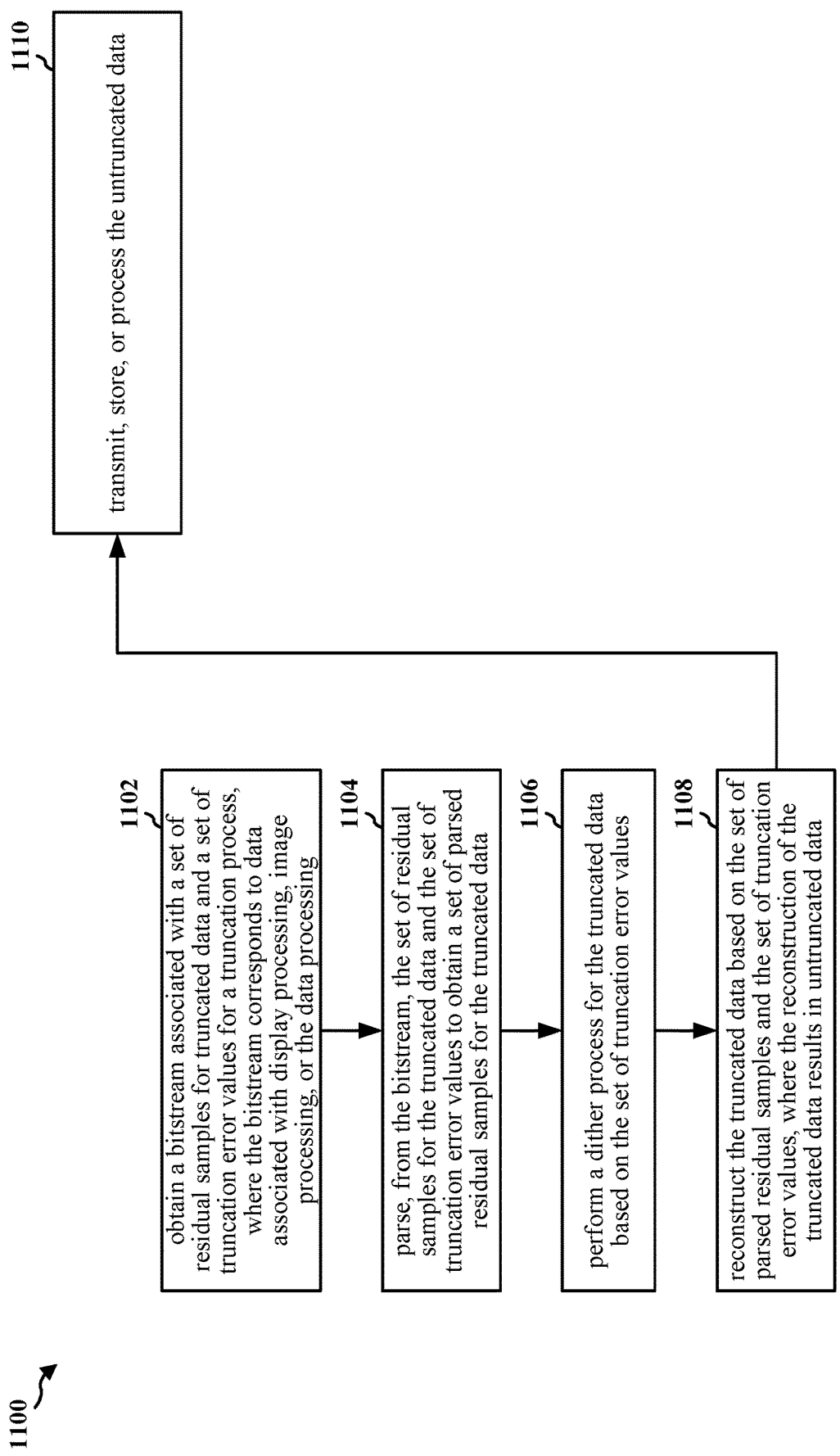
FIG. 11 is a flowchart of an example method of data processing in accordance with one or more techniques of this disclosure.

FIG. 11 is a flowchart 1100 of an example method of data processing in accordance with one or more techniques of this disclosure. The method may be performed by an apparatus, such as an apparatus for data processing, a GPU, a CPU, a DPU or other display processor, a wireless communication device, and the like, as used in connection with the aspects of FIGS. 1-7. The method may be performed by the decoder 405 or the decoder 704. The method may be associated with various advantages, such as a reduction in visual artifacts produced as a by-product of a compression/decompression process. In an example, the method (including the various aspects detailed below) may be performed by the compressor/decompressor 198.

At 1102, the apparatus obtains a bitstream associated with a set of residual samples for truncated data and a set of truncation error values for a truncation process, where the bitstream corresponds to data associated with display processing, image processing, or data processing. For example, FIG. 7 at 720 shows that the decoder 704 may obtain a bitstream associated with a set of residual samples for truncated data and a set of average truncation error values for a truncation process, where the bitstream corresponds to data associated with display processing, image processing, or data processing. In an example, the bitstream may be the bitstream 422, the set of residual samples for the truncated data may be the residuals 414 (or the entropy-coded residuals 418), the set of truncation error values may be or include the average truncation error 410, the truncation process may be the truncation 406, and the truncated data may be the truncated data 408. In an example, 1102 may be performed by the compressor/decompressor 198.

At 1104, the apparatus parses, from the bitstream, the set of residual samples for the truncated data and the set of truncation error values to obtain a set of parsed residual samples for the truncated data. For example, FIG. 7 at 722 shows that the decoder 704 may parse the set of residual samples and the set of average truncation error values from the bitstream. In another example, FIG. 4 shows that the syntax parser 424 of the decoder 405 may parse the bitstream 422 for the average truncation error 410 and the entropy-coded residuals 418. For example, FIG. 7 at 724 shows that the decoder 704 may decode the set of parsed residual samples for the truncated data. In another example, FIG. 4 shows that the entropy decoder 426 may decode the entropy-coded residuals 418 to obtain the residuals 414. In an example, 1104 may be performed by the compressor/decompressor 198.

At 1108, the apparatus reconstructs the truncated data based on the set of parsed residual samples and the set of truncation error values, where the reconstruction of the truncated data results in untruncated data. For example, FIG. 7 at 728 shows that the decoder 704 may reconstruct truncated data based on the set of decided residual samples obtained at 724 and the set of average truncation error values parsed from the bitstream at 722. FIG. 4 also shows that the reconstruction 436 may generate a reconstructed tile 438 (i.e., untruncated data). In a further example, the apparatus may reconstruct the truncated data in accordance with equation (XIV) above. In an example, 1108 may be performed by the compressor/decompressor 198.

In one aspect, parsing the set of residual samples for the truncated data and the set of truncation error values may include entropy decoding the set of residual samples for the truncated data. For example, parsing the set of residual samples and the set of average truncation error values at 722 and decoding the set of parsed residual samples for the truncated data at 724 may include entropy decoding the set of parsed residual samples for the truncated data. In another example, FIG. 4 shows that the entropy decoder 426 of the decoder 405 may entropy decode the entropy-coded residuals 418.

In one aspect, at 1110, the apparatus may transmit, store, or process the untruncated data. For example, FIG. 7 at 730 shows that the decoder 704 may transmit, store, or process the untruncated data after reconstructing the truncated data at 728. In an example, 1110 may be performed by the compressor/decompressor 198.

In one aspect, transmitting the untruncated data may include transmitting the untruncated data from a decoding device to a display, storing the untruncated data may include storing the untruncated data in a memory or a second memory, a cache, or a buffer associated with the decoding device, or processing the untruncated data may include processing the untruncated data at the decoding device. For example, transmitting, storing, or processing the untruncated data at 730 may include transmitting the untruncated data from a decoding device to a display, storing the untruncated data may include storing the untruncated data in a memory or a second memory, a cache, or a buffer associated with the decoding device, or processing the untruncated data may include processing the untruncated data at the decoding device. In another example, the decoder 704 may be included in a decoding device. In a further example, the display may be or include the display(s) 131. In a further example, the untruncated data may be stored at the internal memory 121, the system memory 124, or the internal memory 123.

In one aspect, at 1106, the apparatus may perform a dither process for the truncated data based on the set of truncation error values and reconstructing the truncated data may be further based on the dither process. For example, FIG. 7 at 726 shows that the decoder 704 may perform a dither process for the truncated data based on the set of average truncation error values. In another example, FIG. 4 shows that the dither generator 432 may perform a dither process for the truncated data 408 based on the average truncation error 410. In yet another example, the apparatus may perform the dither process in accordance with one or more of equations (XV), (XVI), (XVII), (XVIII), or (XIX) above or Table 1 above. In a further example, FIG. 7 at 728 shows that the decoder 704 may reconstruct truncated data based on the dither process performed at 726 and the set of decoded residual samples obtained at 724. In another example, FIG. 4 shows that the decoder 405 may perform a reconstruction 436 based on a dither value 434 generated by the dither generator 432 and the residuals 414. FIG. 4 also shows that the reconstruction 436 may generate a reconstructed tile 438 (i.e., untruncated data). In a further example, the apparatus may reconstruct the truncated data in accordance with equation (XIV) above. In an example, 1106 may be performed by the compressor/decompressor 198.

In one aspect, performing the dither process may include determining a dither strength parameter from a look-up table (LUT) based on a truncation error value associated with the set of truncation error values and a quantization parameter, where the LUT may include a plurality of dither strength parameters for a plurality of truncation error values and a plurality of quantization parameters. For example, Table 1 above may be the LUT, the truncation error value may be $TE_{avg}$, and the quantization parameter may be Q. Furthermore, as illustrated above, Table 1 may include a mapping between an average truncation error and a dither strength parameter $d_{max}$ for a selection of quantization parameters.

In one aspect, performing the dither process may include obtaining a dither strength parameter, where the dither strength parameter may be a first value if a truncation error value associated with the set of truncation error values is a first error value, where the dither strength parameter may be a second value if the truncation error value is a second error value, where the first value is greater than the second value, where the first error value is greater than the second error value. For instance, the first example 602 and the second example 604 of FIG. 6 respectively show that the dither strength ($D_{min}$, $D_{max}$) may be relatively large if the average truncation error value is large and that the dither strength ($D_{min}$, $D_{max}$) may be relatively small if the average truncation error value is small. The dither strength ($D_{min}$, $D_{max}$) may correspond to the dither strength parameter $d_{max}$.

In one aspect, performing the dither process may include computing at least one dither matrix. For example, the at least one dither matrix may be or include the scaled dither matrix ($D_{scaled}$) and the base dither matrix ($D_{base}$).

In one aspect, the at least one dither matrix may include a scaled dither matrix and a base dither matrix. For example, the scaled dither matrix may be $D_{scaled}$ and the base dither matrix may be $D_{base}$.

In one aspect, computing the scaled dither matrix may include computing the scaled dither matrix based on one or more of the base dither matrix, a dither strength parameter, at least one value associated with the base dither matrix and the dither strength parameter, and at least one bit shift operation. For example, the apparatus may compute the scaled dither matrix in accordance with equations (XVIII) and (XIX) above.

In one aspect, the dither strength parameter may be symmetric or asymmetric with respect to a truncation error value. For example, the first example 602 and the second example 604 show that the dither strength ($D_{min}$, $D_{max}$) may be symmetric with respect an average truncation error (E). In another example, the dither strength ($D_{min}$, $D_{max}$) may be asymmetric with respect an average truncation error (E). The dither strength ($D_{min}$, $D_{max}$) may correspond to the dither strength parameter $d_{max}$.

In one aspect, the scaled dither matrix may be associated with at least one ordered dither value. For example, $D_{scaled}$ may be associated with at least one ordered dither value.

In one aspect, performing the dither process may include rotating the base dither matrix. For example, the dither processed performed at 726 may include rotating the base dither matrix $D_{base}$.

In one aspect, reconstructing the truncated data based on the dither process and the set of parsed residual samples may include sampling the scaled dither matrix at a position of a sample within a group of samples. For example, reconstructing the truncated data at 728 may include sampling the scaled dither matrix at a position of a sample within a group of samples. In another example, the dither generator 432 of the decoder 405 may determine the dither value 434 for a given sample during reconstruction by sampling $D_{scaled}$ at a position of sample ($s_y$, $s_x$) within a subtile component ($s_y$% 4, $s_x$% 4).

In one aspect, performing the dither process may include computing a dither strength parameter based on one or more of a truncation error value, a quantization parameter, and at least one additional parameter. For example, the dither strength parameter may be $d_{max}$ described above. In another example, the dither strength parameter may be computed in accordance with one or more of equations (XV), (XVI), and (XVII) above.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for performing a truncation process for data, where the data is associated with display processing, image processing, or data processing, where the truncation process for the data results in truncated data. The apparatus may further include means for computing a set of truncation error values associated with the truncation process for the truncated data. The apparatus may further include means for generating a set of residual samples for the truncated data. The apparatus may further include means for generating a bitstream based on the set of residual samples for the truncated data and the set of truncation error values associated with the truncation process. The apparatus may further include means for transmitting or storing the generated bitstream. The means for transmitting the generated bitstream may include means for transmitting the generated bitstream from an encoding device to a decoding device and the means for storing the generated bitstream may include means for storing the generated bitstream in the memory or a second memory, a cache, or a buffer associated with the encoding device. The means for performing the truncation process for the data may include means for performing at least one bit shift operation on a sample of the data based on a quantization parameter. The means for computing the set of truncation error values associated with the truncation process may include means for computing an average truncation error value based on a sum of truncation errors for a group of samples associated with one or more of the data, a shift, a bias, and at least one bit shift operation. The means for computing the set of truncation error values associated with the truncation process may include means for computing an average truncation error value based on a sum of truncation errors for samples in a region within a group of samples associated with one or more of the data, a shift, a bias, and at least one bit shift operation. The means for computing the set of truncation error values associated with the truncation process may include means for computing an average truncation value. The means for computing the average truncation value may include means for computing a first average truncation error value based on at least one of a quantization parameter, a first value, and a first at least one bit shift operation. The means for computing the average truncation value may include means for computing a second average truncation error value based on a sum of truncation errors for a group of samples associated with one or more of the data, a bias, a shift, and a second at least one bit shift operation. The means for computing the average truncation value may include means for selecting a lesser of the first average truncation error value or the second average truncation error value to serve as the average truncation error value. The means for generating the set of residual samples for the truncated data may include means for encoding the set of residual samples for the truncated data. The means for encoding the set of residual samples for the truncated data may include means for entropy encoding the set of residual samples for the truncated data. The apparatus may further include means for obtaining the data. The apparatus may further include means for obtaining a bitstream associated with a set of residual samples for truncated data and a set of truncation error values for a truncation process, where the bitstream corresponds to data associated with display processing, image processing, or data processing. The apparatus may further include means for parsing, from the bitstream, the set of residual samples for the truncated data and the set of average truncation error values to obtain a set of parsed residual samples for the truncated data. The apparatus may further include means for reconstructing the truncated data based on the set of parsed residual samples and the set of truncation error values, where the reconstruction of the truncated data results in untruncated data. The means for parsing the set of residual samples may include means for entropy decoding the set of residual samples for the truncated data. The apparatus may further include means for transmitting, storing, or processing the untruncated data. The means for transmitting the untruncated data may include means for transmitting the untruncated data from a decoding device to a display. The means for storing the untruncated data may include means for storing the untruncated data in the memory or a second memory, a cache, or a buffer associated with the decoding device. The means for processing the untruncated data may include means for processing the untruncated data at the decoding device. The apparatus may further include means for performing, prior to reconstructing the truncated data, a dither process for the truncated data based on the set of truncation error values, where reconstructing the truncated data is further based on the dither process. The means for performing the dither process may include means for computing a dither strength parameter based on one or more of a truncation error value associated with the set of truncation error values, a quantization parameter, and at least one additional parameter. The means for performing the dither process may include means for determining a dither strength parameter from a look-up table (LUT) based on an average truncation error value associated with the set of truncation error values and a quantization parameter, where the LUT includes a plurality of dither strength parameters for a plurality of truncation error values and a plurality of quantization parameters. The means for performing the dither process may include means for computing at least one dither matrix. The means for computing the scaled dither matrix may include means for computing the scaled dither matrix based on one or more of the base dither matrix, a dither strength parameter, at least one value associated with the base dither matrix and the dither strength parameter, and at least one bit shift operation. The means for performing the dither process may include means for rotating the base dither matrix. The means for reconstructing the truncated data based on the dither process and the set of decoded residual samples may include means for sampling the scaled dither matrix at a position of a sample within a group of samples.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus may include means for performing a truncation process for data, where the data is associated with display processing, image processing, or data processing, where the truncation process for the data results in truncated data. The apparatus may further include means for computing a set of truncation error values associated with the truncation process for the truncated data. The apparatus may further include means for generating a set of residual samples for the truncated data. The apparatus may further include means for generating a bitstream based on the set of residual samples for the truncated data and the set of truncation error values associated with the truncation process. The apparatus may further include means for transmitting or storing the generated bitstream. The means for transmitting the generated bitstream may include means for transmitting the generated bitstream from an encoding device to a decoding device and the means for storing the generated bitstream may include means for storing the generated bitstream in the memory or a second memory, a cache, or a buffer associated with the encoding device. The means for performing the truncation process for the data may include means for performing at least one bit shift operation on a sample of the data based on a quantization parameter. The means for computing the set of truncation error values associated with the truncation process may include means for computing an average truncation error value based on a sum of truncation errors for a group of samples associated with one or more of the data, a shift, a bias, and at least one bit shift operation. The means for computing the set of truncation error values associated with the truncation process may include means for computing an average truncation error value based on a sum of truncation errors for samples in a region within a group of samples associated with one or more of the data, a shift, a bias, and at least one bit shift operation. The means for computing the set of truncation error values associated with the truncation process may include means for computing an average truncation value. The means for computing the average truncation value may include means for computing a first average truncation error value based on at least one of a quantization parameter, a first value, and a first at least one bit shift operation. The means for computing the average truncation value may include means for computing a second average truncation error value based on a sum of truncation errors for a group of samples associated with one or more of the data, a bias, a shift, and a second at least one bit shift operation. The means for computing the average truncation value may include means for selecting a lesser of the first average truncation error value or the second average truncation error value to serve as the average truncation error value. The means for generating the set of residual samples for the truncated data may include means for encoding the set of residual samples for the truncated data. The means for encoding the set of residual samples for the truncated data may include means for entropy encoding the set of residual samples for the truncated data. The apparatus may further include means for obtaining the data. The apparatus may further include means for obtaining a bitstream associated with a set of residual samples for truncated data and a set of truncation error values for a truncation process, where the bitstream corresponds to data associated with display processing, image processing, or data processing. The apparatus may further include means for parsing, from the bitstream, the set of residual samples for the truncated data and the set of average truncation error values to obtain a set of parsed residual samples for the truncated data. The apparatus may further include means for reconstructing the truncated data based on the set of parsed residual samples and the set of truncation error values, where the reconstruction of the truncated data results in untruncated data. The means for parsing the set of residual samples may include means for entropy decoding the set of residual samples for the truncated data. The apparatus may further include means for transmitting, storing, or processing the untruncated data. The means for transmitting the untruncated data may include means for transmitting the untruncated data from a decoding device to a display. The means for storing the untruncated data may include means for storing the untruncated data in the memory or a second memory, a cache, or a buffer associated with the decoding device. The means for processing the untruncated data may include means for processing the untruncated data at the decoding device. The apparatus may further include means for performing, prior to reconstructing the truncated data, a dither process for the truncated data based on the set of truncation error values, where reconstructing the truncated data is further based on the dither process. The means for performing the dither process may include means for computing a dither strength parameter based on one or more of a truncation error value associated with the set of truncation error values, a quantization parameter, and at least one additional parameter. The means for performing the dither process may include means for determining a dither strength parameter from a look-up table (LUT) based on an average truncation error value associated with the set of truncation error values and a quantization parameter, where the LUT includes a plurality of dither strength parameters for a plurality of truncation error values and a plurality of quantization parameters. The means for performing the dither process may include means for computing at least one dither matrix. The means for computing the scaled dither matrix may include means for computing the scaled dither matrix based on one or more of the base dither matrix, a dither strength parameter, at least one value associated with the base dither matrix and the dither strength parameter, and at least one bit shift operation. The means for performing the dither process may include means for rotating the base dither matrix. The means for reconstructing the truncated data based on the dither process and the set of decoded residual samples may include means for sampling the scaled dither matrix at a position of a sample within a group of samples.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of data processing, including: performing a truncation process for data, where the data is associated with display processing, image processing, or the data processing, where the truncation process for the data results in truncated data; computing a set of truncation error values associated with the truncation process for the truncated data; generating a set of residual samples for the truncated data; and generating a bitstream based on the set of residual samples for the truncated data and the set of truncation error values associated with the truncation process.

Aspect 2 may be combined with aspect 1 and further includes transmitting or storing the generated bitstream.

Aspect 3 may be combined with aspect 2 and includes that transmitting the generated bitstream includes transmitting the generated bitstream from an encoding device to a decoding device, or where storing the generated bitstream includes storing the generated bitstream in a memory or a second memory, a cache, or a buffer associated with the encoding device.

Aspect 4 may be combined with any of aspects 1-3 and includes that performing the truncation process for the data includes performing at least one bit shift operation on a sample of the data based on a quantization parameter.

Aspect 5 may be combined with any of aspects 1-4 and includes that computing the set of truncation error values associated with the truncation process for the truncated data includes computing an average truncation error value based on a sum of truncation errors for a group of samples associated with one or more of the data, a shift, a bias, and at least one bit shift operation.

Aspect 6 may be combined with any of aspects 1-4 and includes that computing the set of truncation error values associated with the truncation process for the truncated data includes computing an average truncation error value based on a sum of truncation errors for samples in a region within a group of samples associated with one or more of the data, a shift, a bias, and at least one bit shift operation.

Aspect 7 may be combined with any of aspects 1-4 and includes that computing the set of truncation error values associated with the truncation process for the truncated data includes computing an average truncation error value, where computing the average truncation error value includes: computing a first average truncation error value based on at least one of a quantization parameter, a first value, and a first at least one bit shift operation; computing a second average truncation error value based on a sum of truncation errors for a group of samples associated with one or more of the data, a bias, a shift, and a second at least one bit shift operation; and selecting a lesser of the first average truncation error value or the second average truncation error value to serve as the average truncation error value.

Aspect 8 may be combined with any of aspects 1-4 and includes that computing the set of truncation error values associated with the truncation process for the truncated data includes computing an average truncation error value based on a sum of truncation errors for a group of samples associated with one or more of the data, a shift, a bias, a quantization parameter factor, and at least one bit shift operation.

Aspect 9 may be combined with aspect 8 and includes that the average truncation error value is computed based on the sum of the truncation errors for the group of samples, the shift, the bias, the quantization parameter factor, and the at least one bit shift operation if a quantization parameter is greater than a threshold quantization parameter.

Aspect 10 may be combined with any of aspects 1-9 and includes that the set of truncation error values for the truncation process in the bitstream includes an average truncation error value for each region within a group of samples associated with the data.

Aspect 11 may be combined with any of aspects 1-10 and includes that generating the set of residual samples for the truncated data includes encoding the set of residual samples for the truncated data.

Aspect 12 may be combined with aspect 11 and includes that encoding the set of residual samples for the truncated data includes entropy encoding the set of residual samples for the truncated data.

Aspect 13 may be combined with any of aspects 1-12 and includes that computing the set of truncation error values includes computing at least one representative value that collectively represents the set of truncation error values.

Aspect 14 may be combined with aspect 13 and includes that obtaining the data includes: receiving the data from a graphics processing unit (GPU), a central processing unit (CPU), or a camera.

Aspect 15 is an apparatus for data processing including at least one processor coupled to a memory and, based at least in part on information stored in the memory, the at least one processor is configured to implement a method as in any of aspects 1-14.

Aspect 16 may be combined with aspect 15 and includes that the apparatus is a wireless communication device, further including at least one of an antenna or a transceiver coupled to the at least one processor, and further includes obtaining the data via at least one of the antenna or the transceiver.

Aspect 17 is an apparatus for data processing including means for implementing a method as in any of aspects 1-14.

Aspect 18 is a computer-readable medium (e.g., a non-transitory computer-readable medium) storing computer executable code, the code when executed by at least one processor causes the at least one processor to implement a method as in any of aspects 1-14.

Aspect 19 is a method of data processing, including: obtaining a bitstream associated with a set of residual samples for truncated data and a set of truncation error values for a truncation process, where the bitstream corresponds to data associated with display processing, image processing, or the data processing; parsing, from the bitstream, the set of residual samples for the truncated data and the set of average truncation error values to obtain a set of parsed residual samples for the truncated data; and reconstructing the truncated data based on the set of decoded residual samples and the set of truncation error values, where the reconstruction of the truncated data results in untruncated data.

Aspect 20 may be combined with aspect 19 and includes that parsing the set of residual samples for the truncated data and the set of truncation error values includes entropy decoding the set of residual samples for the truncated data.

Aspect 21 may be combined with any of aspects 19-20 and further includes transmitting, storing, or processing the untruncated data.

Aspect 22 may be combined with aspect 21 and includes that transmitting the untruncated data includes transmitting the untruncated data from a decoding device to a display, where storing the untruncated data includes storing the untruncated data in a memory or a second memory, a cache, or a buffer associated with the decoding device, or where processing the untruncated data includes processing the untruncated data at the decoding device.

Aspect 23 may be combined with any of aspects 19-22 and further includes performing, prior to reconstructing the truncated data, a dither process for the truncated data based on the set of truncation error values, where reconstructing the truncated data is further based on the dither process.

Aspect 24 may be combined with aspect 23 and includes that performing the dither process includes determining a dither strength parameter from a look-up table (LUT) based on a truncation error value associated with the set of truncation error values and a quantization parameter, where the LUT includes a plurality of dither strength parameters for a plurality of truncation error values and a plurality of quantization parameters.

Aspect 25 may be combined with any of aspects 23-24 and includes that performing the dither process includes obtaining a dither strength parameter, where the dither strength parameter is a first value if a truncation error value associated with the set of truncation error values is a first error value, where the dither strength parameter is a second value if the truncation error value is a second error value, where the first value is greater than the second value, where the first error value is greater than the second error value.

Aspect 26 may be combined with any of aspects 23-25 and includes that performing the dither process includes computing at least one dither matrix.

Aspect 27 may be combined with aspect 26 and includes that the at least one dither matrix includes a scaled dither matrix and a base dither matrix.

Aspect 28 may be combined with aspect 27 and includes that computing the scaled dither matrix includes computing the scaled dither matrix based on one or more of the base dither matrix, a dither strength parameter, at least one value associated with the base dither matrix and the dither strength parameter, and at least one bit shift operation.

Aspect 29 may be combined with aspect 28 and includes that the dither strength parameter is symmetric or asymmetric with respect to a truncation error value.

Aspect 30 may be combined with any of aspects 27-29 and includes that the scaled dither matrix is associated with at least one ordered dither value.

Aspect 31 may be combined with any of aspects 27-30 and includes that performing the dither process includes rotating the base dither matrix.

Aspect 32 may be combined with any of aspects 27-31 and includes that reconstructing the truncated data based on the dither process and the set of decoded residual samples includes sampling the scaled dither matrix at a position of a sample within a group of samples.

Aspect 33 may be combined with any of aspects 23 and 25-32 and includes that performing the dither process includes computing a dither strength parameter based on one or more of a truncation error value associated with the set of truncation error values, a quantization parameter, or at least one additional parameter.

Aspect 34 is an apparatus for data processing including at least one processor coupled to a memory and, based at least in part on information stored in the memory, the at least one processor is configured to implement a method as in any of aspects 19-33.

Aspect 35 may be combined with aspect 34 and includes that the apparatus is a wireless communication device, further including at least one of an antenna or a transceiver coupled to the at least one processor, where to obtain the bitstream, the at least one processor is configured to receive the bitstream via at least one of the antenna or the transceiver.

Aspect 36 is an apparatus for data processing including means for implementing a method as in any of aspects 19-33.

Aspect 37 is a computer-readable medium (e.g., a non-transitory computer-readable medium) storing computer executable code, the code when executed by at least one processor causes the at least one processor to implement a method as in any of aspects 19-33.

Various aspects have been described herein. These and other aspects are within the scope of the following claims.

What is claimed is:
1. An apparatus for data processing, comprising:
a memory; and
at least one processor coupled to the memory and, based at least in part on information stored in the memory, the at least one processor is configured to:

perform a truncation process on data to generate truncated data, wherein the data is associated with display processing, image processing, or the data processing;

compute a set of truncation error values associated with the truncation process for the truncated data;

generate a set of residual samples for the truncated data; and generate a bitstream based on the set of residual samples for the truncated data associated with the truncation process, wherein the bitstream comprises the set of truncation error values associated with the truncation process.

2. The apparatus of claim 1, wherein the at least one processor is further configured to:

transmit or store the generated bitstream.

3. The apparatus of claim 2, wherein, to transmit the generated bitstream, the at least one processor is configured to:

transmit the generated bitstream from an encoding device to a decoding device; or wherein, to store the generated bitstream, the at least one processor is configured to:

store the generated bitstream in the memory or a second memory, a cache, or a buffer associated with the encoding device.

4. The apparatus of claim 1, wherein, to perform the truncation process for the data, the at least one processor is configured to;

perform at least one bit shift operation on a sample of the data based on a quantization parameter.

5. The apparatus of claim 1, wherein, to compute the set of truncation error values associated with the truncation process for the truncated data, the at least one processor is configured to:

compute an average truncation error value based on a sum of truncation errors for a group of samples associated with one or more of the data, a shift, a bias, or at least one bit shift operation.

6. The apparatus of claim 1, wherein, to compute the set of truncation error values associated with the truncation process for the truncated data, the at least one processor is configured to:

compute an average truncation error value based on a sum of truncation errors for samples in a region within a group of samples associated with one or more of the data, a shift, a bias, or at least one bit shift operation.

7. The apparatus of claim 1, wherein, to compute the set of truncation error values associated with the truncation process for the truncated data, the at least one processor is configured to;

compute an average truncation error value, wherein, to compute the average truncation error value, the at least one processor is configured to:

compute a first average truncation error value based on at least one of a quantization parameter, a first value, and a first at least one bit shift operation;

compute a second average truncation error value based on a sum of truncation errors for a group of samples associated with one or more of the data, a bias, a shift, or a second at least one bit shift operation; and select a lesser of the first average truncation error value or the second average truncation error value to serve as the average truncation error value.

8. The apparatus of claim 1, wherein, to compute the set of truncation error values associated with the truncation process for the truncated data, the at least one processor is configured to:

compute an average truncation error value based on a sum of truncation errors for a group of samples associated with one or more of the data, a shift, a bias, a quantization parameter factor, or at least one bit shift operation.

9. The apparatus of claim 8, wherein, to compute the average truncation error value, the at least one processor is configured to:

compute the average truncation error value based on the sum of the truncation errors for the group of samples, the shift, the bias, the quantization parameter factor, and the at least one bit shift operation if a quantization parameter is greater than a threshold quantization parameter.

10. The apparatus of claim 1, wherein the set of truncation error values for the truncation process in the bitstream includes an average truncation error value for each region within a group of samples associated with the data.

11. The apparatus of claim 1, wherein, to generate the set of residual samples for the truncated data, the at least one processor is configured to:

encode the set of residual samples for the truncated data.

12. The apparatus of claim 11, wherein, to encode the set of residual samples for the truncated data, the at least one processor is configured to:

entropy encode the set of residual samples for the truncated data.

13. The apparatus of claim 1, wherein, to compute the set of truncation error values, the at least one processor is configured to:

compute at least one representative value that collectively represents the set of truncation error values.

14. The apparatus of claim 1, wherein the apparatus is a wireless communication device, further comprising at least one of an antenna or a transceiver coupled to the at least one processor, wherein the at least one processor is further configured to:

obtain the data via at least one of the antenna or the transceiver.

15. An apparatus for data processing, comprising:

a memory; and at least one processor coupled to the memory and, based at least in part on information stored in the memory, the at least one processor is configured to:

obtain a bitstream associated with a set of residual samples for truncated data for a truncation process, wherein the bitstream comprises a set of truncation error values for the truncation process, wherein the bitstream corresponds to data associated with display processing, image processing, or the data processing;

parse, from the bitstream, the set of residual samples for the truncated data and the set of truncation error values to obtain a set of parsed residual samples for the truncated data; and reconstruct the truncated data to generate untruncated data based on the set of parsed residual samples and the set of truncation error values.

16. The apparatus of claim 15, wherein, to parse the set of residual samples for the truncated data and the set of truncation error values, the at least one processor is configured to;

entropy decode the set of residual samples for the truncated data.

17. The apparatus of claim 15, wherein the at least one processor is further configured to:
transmit, store, or process the untruncated data.

18. The apparatus of claim 17,
wherein, to transmit the untruncated data, the at least one processor is configured to:
transmit the untruncated data from a decoding device to a display;
wherein, to store the untruncated data, the at least one processor is configured to:
store the untruncated data in the memory or a second memory, a cache, or a buffer associated with the decoding device; or
wherein, to process the untruncated data, the at least one processor is configured to:
process the untruncated data at the decoding device.

19. The apparatus of claim 15, wherein the at least one processor is further configured to:
perform, prior to the at least one processor being configured to reconstruct the truncated data, a dither process for the truncated data based on the set of truncation error values, wherein, to reconstruct the truncated data, the at least one processor is configured to;
reconstruct the truncated data further based on the dither process.

20. The apparatus of claim 19, wherein, to perform the dither process, the at least one processor is configured to;
determine a dither strength parameter from a look-up table (LUT) based on a truncation error value associated with the set of truncation error values and a quantization parameter, wherein the LUT comprises a plurality of dither strength parameters for a plurality of truncation error values and a plurality of quantization parameters.

21. The apparatus of claim 19, wherein to perform the dither process, the at least one processor is configured to;
obtain a dither strength parameter, wherein the dither strength parameter is a first value if a truncation error value associated with the set of truncation error values is a first error value, wherein the dither strength parameter is a second value if the truncation error value is a second error value, wherein the first value is greater than the second value, wherein the first error value is greater than the second error value.

22. The apparatus of claim 19, wherein, to perform the dither process, the at least one processor is configured to;
compute at least one dither matrix.

23. The apparatus of claim 22, wherein the at least one dither matrix comprises a scaled dither matrix and a base dither matrix.

24. The apparatus of claim 23, wherein, to compute the scaled dither matrix, the at least one processor is configured to;
compute the scaled dither matrix based on one or more of the base dither matrix, a dither strength parameter, at least one value associated with the base dither matrix and the dither strength parameter, or at least one bit shift operation.

25. The apparatus of claim 24, wherein the dither strength parameter is symmetric or asymmetric with respect to a truncation error value.

26. The apparatus of claim 23, wherein, to perform the dither process, the at least one processor is configured to;
rotate the base dither matrix.

27. The apparatus of claim 19, wherein, to perform the dither process, the at least one processor is configured to;
compute a dither strength parameter based on one or more of a truncation error value associated with the set of truncation error values, a quantization parameter, or at least one additional parameter.

28. The apparatus of claim 15, wherein the apparatus is a wireless communication device, further comprising at least one of an antenna or a transceiver coupled to the at least one processor, wherein, to obtain the bitstream, the at least one processor is configured to:
receive the bitstream via at least one of the antenna or the transceiver.

29. A method of data processing, comprising:
performing a truncation process on data to generate truncated data, wherein the data is associated with display processing, image processing, or the data processing;
computing a set of truncation error values associated with the truncation process for the truncated data;
generating a set of residual samples for the truncated data; and
generating a bitstream based on the set of residual samples for the truncated data associated with the truncation process, wherein the bitstream comprises the set of truncation error values associated with the truncation process.

30. A method of data processing, comprising:
obtaining a bitstream associated with a set of residual samples for truncated data for a truncation process, wherein the bitstream comprises a set of truncation error values for the truncation process, wherein the bitstream corresponds to data associated with display processing, image processing, or the data processing;
parsing, from the bitstream, the set of residual samples for the truncated data and the set of truncation error values to obtain a set of parsed residual samples for the truncated data; and
reconstructing the truncated data to generate untruncated data based on the set of parsed residual samples and the set of truncation error values.

* * * * *